United States Patent
Chen et al.

(10) Patent No.: US 10,136,119 B2
(45) Date of Patent: Nov. 20, 2018

(54) VIEW SYNTHESIS IN 3D VIDEO

(71) Applicant: QUALCOMM Incorporated, San Diego, CA (US)

(72) Inventors: Ying Chen, San Diego, CA (US); Ye-Kui Wang, San Diego, CA (US); Li Zhang, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 499 days.

(21) Appl. No.: 14/151,586

(22) Filed: Jan. 9, 2014

(65) Prior Publication Data

US 2014/0192157 A1    Jul. 10, 2014

Related U.S. Application Data

(60) Provisional application No. 61/751,211, filed on Jan. 10, 2013.

(51) Int. Cl.
| | |
|---|---|
| *H04N 13/00* | (2018.01) |
| *H04N 13/161* | (2018.01) |
| *H04N 19/597* | (2014.01) |
| *H04N 19/176* | (2014.01) |
| *H04N 19/70* | (2014.01) |
| *H04N 19/58* | (2014.01) |
| *H04N 19/577* | (2014.01) |

(52) U.S. Cl.
CPC ......... *H04N 13/161* (2018.05); *H04N 19/176* (2014.11); *H04N 19/577* (2014.11); *H04N 19/58* (2014.11); *H04N 19/597* (2014.11); *H04N 19/70* (2014.11)

(58) Field of Classification Search
CPC ............. H04N 13/0048; H04N 19/176; H04N 19/577; H04N 19/58; H04N 19/597; H04N 19/70
See application file for complete search history.

(56) References Cited

U.S. PATENT DOCUMENTS

| | | | |
|---|---|---|---|
| 2006/0146143 A1* | 7/2006 | Xin | H04N 19/597 348/218.1 |
| 2007/0109409 A1 | 5/2007 | Yea et al. | |

(Continued)

FOREIGN PATENT DOCUMENTS

| | | |
|---|---|---|
| CN | 101035261 A | 9/2007 |
| CN | 101198061 A | 6/2008 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Md N Haque
(74) *Attorney, Agent, or Firm* — Shumaker & Sieffert, P.A.

(57) ABSTRACT

In an example, a method of decoding video data includes determining whether a reference index for a current block corresponds to an inter-view reference picture, and when the reference index for the current block corresponds to the inter-view reference picture, obtaining, from an encoded bitstream, data indicating a view synthesis prediction (VSP) mode of the current block, where the VSP mode for the reference index indicates whether the current block is predicted with view synthesis prediction from the inter-view reference picture.

40 Claims, 7 Drawing Sheets

(56) References Cited

U.S. PATENT DOCUMENTS

| | | | | |
|---|---|---|---|---|
| 2009/0279608 | A1* | 11/2009 | Jeon | H04N 19/597 375/240.16 |
| 2010/0026882 | A1* | 2/2010 | Jeon | H04N 19/597 348/385.1 |
| 2010/0135391 | A1* | 6/2010 | Tian | H04N 19/597 375/240.12 |
| 2012/0069903 | A1* | 3/2012 | Lim | H04N 13/0066 375/240.12 |
| 2012/0314027 | A1* | 12/2012 | Tian | H04N 7/181 348/43 |
| 2013/0100245 | A1* | 4/2013 | Lee | H04N 13/0048 348/43 |
| 2013/0176389 | A1 | 7/2013 | Chen et al. | |
| 2013/0229485 | A1 | 9/2013 | Rusanovskyy et al. | |
| 2013/0271566 | A1 | 10/2013 | Chen et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, 27 Apr. 7-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Shimizu, et al., "CE1.h: VSP signalling by reference picture index," NTT Corporation, Joint Collaborative Team on 3D Video Coding Extensions of ITU-T SG 16 WP 3 and ISO/IEC JTC 1/SC 29/WG 11, JCT3V-D0212r1, 4th Meeting: Incheon, KR, Apr. 20-26, 2013, 5 pp.

Su, et al., "CE1.a related: Harmonization of inter-view and view synthesis prediction in 3D-AVC," Joint Collaborative Team on 3D Video Coding Extensions of ITU-T SG 16 WP 3 and ISO/IEC JTC 1/SC 29/WG 11, JCT3V-D0162, 4th Meeting: Incheon, KR, Apr. 20-26, 2013, 9 pp.

Wu, et al., "3D-CE1.a: Inter-view skip/direct mode with sub-partition scheme", JCT-3V Meeting; MPEG Meeting; Geneva; (The Joint Collaborative Team on 3DVIDEO Coding Extension Development of ISO/IEC JTC1/SC29/WG11 and ITU-T SG.16 ); URL: http://phenix.int-evry.fr/jct2/, No. JCT3V-C0130, Jan. 17-23, 2013, XP030130546, 6 pp.

Zhao, et al., "3D-CE1.a: Generalized view synthesis prediction (GVSP) mode", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16 ); No. JCT3V-A0103, XP030130102, 6 pp.

Zhao, et al., "3D-CE1.a: Results on GVSP", MPEG Meeting; Jan. 17-23, 2013; Geneva; (Motion Picture Expert Group or ISO/IEC JTC1/SC29/WG11), Document: JCT3V-C0053, No. m27788, XP030056341, 3 pp.

Zhao, et al., "3D-CE1.A: Generalized view synthesis prediction (GVSP) mode," JCT-3V Meeting; MPEG Meeting; Oct. 13-19, 2012, Document: JCT3V-B0054, 4 pp.

Hannuksela, et al., "3D-AVC Draft Text 4," JCT-3V Meeting; MPEG Meeting; Oct. 13-19, 2012, Document: JCT3V-B1002; 75 pp.

Hannuksela, "Test Model for AVC based 3D video coding," ISO/IEC JTC1/SC29/WG11 MPEG2012/N12558, Mar. 2012, 18 pp.

International Search Report and Written Opinion from International Application No. PCT/US2014/011119, dated Apr. 3, 2014, 14 pp.

Response to Written Opinion dated Apr. 3, 2014, from International Application No. PCT/US2014/011119, filed on Nov. 10, 2014, 23 pp.

Second Written Opinion from International Application No. PCT/US2014/011119, dated Jan. 9, 2015, 8 pp.

Response to Second Written Opinion from International Application No. PCT/US2014/011119, filed on Mar. 9, 2015, 24 pp.

International Preliminary Report on Patentability from International Application No. PCT/US2014/011119, dated Apr. 30, 2015, 22 pp.

Su W. et al., "3DV-CE1.a: Block-based View Synthesis Prediction for 3DV-ATM", JCT2-A0107, 101. MPEG Meeting; Jul. 16, 2012-Jul. 20, 2012; Stockholm; (Motion Picture Expert Group or ISO/IEC JTC1/SC29/WG11),, No. m26069, Jul. 10, 2012, XP030054484, pp. 5.

Office Action and Taiwan Search Report—TW103101045—TIPO—dated Apr. 7, 2016 (14 pages).

\* cited by examiner

VIEW SYNTHESIS IN 3D VIDEO

This application claims the benefit of U.S. Provisional Application No. 61/751,211, filed Jan. 10, 2013, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding information related to view synthesis prediction. View synthesis prediction generally refers to a video coding technique for multi-view video coding in which a synthesized view component is used as a reference picture when coding a picture of a view using inter-view prediction. The techniques of this disclosure include determining whether to apply view synthesis prediction for a particular block of video data based on an indication provided in the bitstream for inter-view reference pictures.

In one example, a method of decoding video data includes determining whether a reference index for a current block corresponds to an inter-view reference picture, and when the reference index for the current block corresponds to the inter-view reference picture, obtaining, from an encoded bitstream, data indicating a view synthesis prediction (VSP) mode of the current block, wherein the VSP mode for the reference index indicates whether the current block is predicted with view synthesis prediction from the inter-view reference picture.

In another example, an apparatus for decoding video data includes a memory storing video data including a current block and one or more processors configured to determine whether a reference index for the current block corresponds to an inter-view reference picture, and when the reference index for the current block corresponds to the inter-view reference picture, obtain, from an encoded bitstream, data indicating a view synthesis prediction (VSP) mode of the current block, wherein the VSP mode for the reference index indicates whether the current block is predicted with view synthesis prediction from the inter-view reference picture.

In another example, a method of encoding video data includes determining whether a reference index for a current block corresponds to an inter-view reference picture, when the reference index for the current block corresponds to the inter-view reference picture, generating data indicating a view synthesis prediction (VSP) mode of the current block, wherein the VSP mode for the reference index indicates whether the current block is predicted with view synthesis prediction from the inter-view reference picture, and encoding the data indicating the VSP mode in a bitstream.

In another example, an apparatus for encoding video data includes a memory storing video data including a current block, and one or more processors configured to determine whether a reference index for a current block corresponds to an inter-view reference picture, when the reference index for the current block corresponds to the inter-view reference picture, generate data indicating a view synthesis prediction (VSP) mode of the current block, wherein the VSP mode for the reference index indicates whether the current block is predicted with view synthesis prediction from the inter-view reference picture, and encode the data indicating the VSP mode in a bitstream.

In another example, a non-transitory computer-readable medium has instructions stored thereon that, when executed, cause one or more processors to determine whether a reference index for a current block corresponds to an inter-view reference picture, and when the reference index for the current block corresponds to the inter-view reference picture, code data indicating a view synthesis prediction (VSP) mode of the current block, wherein the VSP mode for the reference index indicates whether the current block is predicted with view synthesis prediction from the inter-view reference picture.

In another example, an apparatus for coding video data includes means for determining whether a reference index for a current block corresponds to an inter-view reference picture, and when the reference index for the current block corresponds to the inter-view reference picture, means for coding data indicating a view synthesis prediction (VSP)

mode of the current block, wherein the VSP mode for the reference index indicates whether the current block is predicted with view synthesis prediction from the inter-view reference picture.

The details of one or more examples are set forth in the accompanying drawings and the description below. Other features, objects, and advantages will be apparent from the description and drawings, and from the claims.

DETAILED DESCRIPTION

Figure 1:
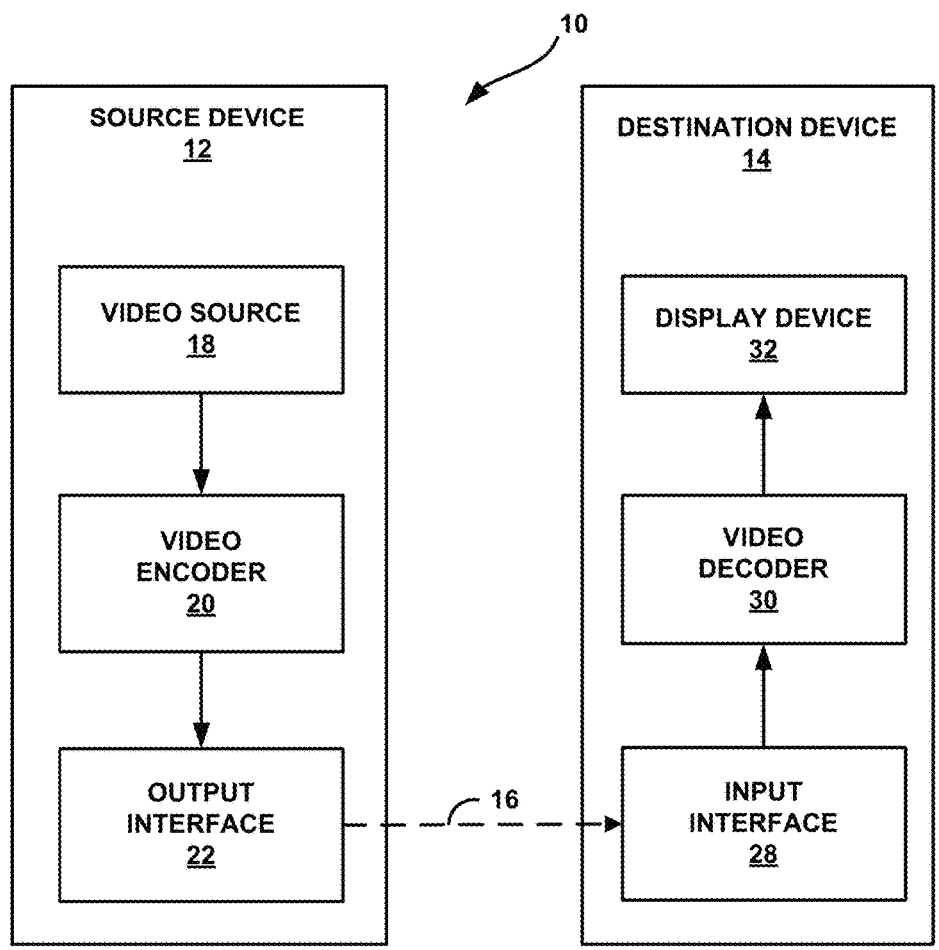
FIG. 1 is a block diagram illustrating an example video encoding and decoding system that may utilize the techniques described in this disclosure.

In general, this disclosure describes techniques for coding and processing multiview video data, e.g., video data used to produce a three-dimensional (3D) effect. Thus, aspects of this disclosure may be related to 3D video coding based on advanced codecs, including the coding of two or more views of a picture with depth maps. In particular, aspects of this disclosure may be related to view synthesis prediction support signaling in a 3D video coding process.

The techniques of this disclosure may be applied to a variety of different video coding standards. For example, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC, or H.264/AVC), including its Scalable Video Coding (SVC) and Multi-view Video Coding (MVC) extensions. A recent joint draft of MVC is described in "Advanced video coding for generic audiovisual services," ITU-T Recommendation H.264, March 2010.

In addition, there is a new video coding standard, namely HEVC, which has been developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD4 hereinafter, is available from http://phenix.int-evey.fr/jct/doc_end_user/documents/6_Torino/wg11/JCTVC-F803-v8.zip. Another WD of HEVC, and referred to as HEVC WD9 hereinafter, is available from http://phenix.int-evry.fr/jct/doc_end_user/documents/11_Shanghai/wg11/JC TVC-K1003-v10.zip.

Recent standardization activities in MPEG included a Call for Proposal (CfP) for 3D video technologies. Among the responses, techniques are selected to be included in the current 3D reference software. One potential standard is H.264/AVC based 3D video coding, which may code both texture and depth for each view. The main coding tools for the AVC-based 3D Video Coding (3D-AVC) (referred to herein as 3DV WD4) are described in document JCT3V-B1002 ("3D-AVC Draft Text 4," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, available publically from http://phenix.it-sudparis.eu/jct2/doc_end_user/current_document.php?id=456). The latest reference software description is "Test Model for AVC based 3D video coding," Miska M. Hannuksela, ISO/IEC JTC1/SC29/WG11 MPEG2011/N12558, San Jose, USA, February 2012. The latest reference software may be referred to herein as ATM or 3D-ATM, and is available publically at http://mpeg3dv.research.nokia.com/svn/mpeg3dv/trunk/.

In some examples, the techniques of this disclosure may be applied to a 3D video (3DV) coding standard that is based on H.264/AVC. Accordingly, for purposes of illustration, the techniques of this disclosure are described primarily with respect to a 3DV extension of ITU-T H.264/AVC. However, it should be understood that the techniques may be applied to other standards for coding video data used to produce a three-dimensional effect, such as a 3D video (3DV) extension of the HEVC standard or other coding standard.

In any case, according to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

With respect to 3D video coding, to produce a three-dimensional effect in video, two views of a scene, e.g., a left eye view and a right eye view, may be shown simultaneously or nearly simultaneously. Two pictures of the same scene, corresponding to the left eye view and the right eye view of the scene, may be captured (or generated, e.g., as computer-generated graphics) from slightly different horizontal positions, representing the horizontal disparity between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect.

Video coding techniques related to multi-view coding (or stereo view coding) may generally include inter-view prediction and/or coding depth information. Inter-view prediction generally includes coding pictures of a base view using standard intra-prediction or inter-prediction, then predicting pictures of other views relative to the base view or other views. In this manner, some pictures of a non-base view may be predicted relative to pictures of the base view or another non-base view.

Typically, when a picture is coded relative to a reference picture, video coding devices signal the reference picture as a member of a reference picture list. Thus, for inter-view coding, reference pictures added to the reference picture list may include pictures of other views, in addition to other pictures of the current view, e.g., for temporal prediction. The reference picture list construction process can flexibly arrange temporal and view prediction references. This may provide not only potential coding efficiency gain but also error resilience, since reference picture selection and redundant picture mechanisms can then be extended to the view dimension.

In the current context of 3DV, video coders may code both texture information (e.g., luminance/brightness and chrominance/color) and depth information for each view of a multiview bitstream. Thus, 3DV video coders may be configured to code depth maps. Depth maps are pictures whose pixel values represent the three-dimensional depths of objects shown in corresponding texture pictures. A depth map may be coded as another view of an access unit. That is, in addition to texture pictures for different views, one or more views represented in an access unit may include a respective depth map. A depth map for a view may also be referred to as a "depth view component" of the access unit. The term "view component" may be used to refer to both the texture view component and the depth view component of a particular view of an access unit.

Hence, a 3DV bitstream may include a coded representation of multiple views, each of which may contain both texture information (texture view components) and depth information (depth view components). Though 3DV also contains texture of multiple views, in some cases, a 3DV bitstream may be compatible to a multiview bitstream.

By providing depth information, a device may render pictures for various views other than those provided in the bitstream. For example, if two views with depth information are provided in a bitstream, a client device may use the depth information to generate a picture for a third view, e.g., between the two coded views of the bitstream. Generation of such pictures is referred to as depth image based rendering (DIBR). DIBR can be used to generate a view based on available texture and depth images. Such a generation process is called view synthesis.

View synthesis can be used for post-processing following decoding of the views (also referred to as "post-loop" view synthesis"). Additionally or alternatively, view synthesis may be used to generate reference pictures used for inter-view prediction (also referred to as "in-loop" view synthesis). It should be understood that DIBR may be used to render a texture picture, a depth picture (typically referred to as a depth map), or both. In general, depth maps are represented similar to luminance (luma) data of texture pictures, without including chrominance information, except that the pixel values of the depth map represent depth for corresponding texture information, rather than brightness information.

With respect to in-loop view synthesis, a reference picture generated using view synthesis, sometimes referred to as a view synthesis reference picture (VSRP) (or, alternatively, view synthesis prediction picture), can be used as a reference picture similar to a temporal inter-prediction reference picture or an inter-view reference picture. A VSRP can be included in a reference picture list. In some specific designs of conventional coding techniques, multiple views (with depth) can be used to generate just one VSRP through DIBR. Thus, for a picture that is currently being coded, only one VSRP may be available in these conventional coding techniques.

In-loop View Synthesis Prediction (VSP) is supported in the current H.264/AVC-based 3D video coding standard for enhanced texture coding (WD4, noted above). To enable VSP for coding the current view, the previously coded texture and depth view components of the same access unit may be used for the view synthesis. A synthesized picture resulting from VSP is included in the initial reference picture lists (e.g., RefPicList0 and/or RefPicList1) following temporal and inter-view reference frames.

Document "3D-CE1.a: Generalized View Synthesis Prediction (GVSP) mode," Joint Collaborative Team on 3D Video Coding Extension Development of ITU-T SG 16 WP 3 and ISO/IEC JTC 1/SC 29/WG 11 2nd Meeting: Shanghai, CN, 13-19 Oct. 2012, JCT3V-B0054 proposed a view synthesis process referred to as generalized view synthesis prediction (GVSP). In GVSP, a flag is introduced at multiple levels, macroblock or lower, to indicate whether a block is coded as skip mode and predicted from the view synthesized picture.

Signaling of view synthesis prediction may be based on a traditional reference index, which is transparent to the H.264/AVC design in terms of MB level signaling. For example, for each MB, a video coder may determine whether to use view synthesis based on a reference index identifying the view synthesis picture in a reference picture list, and the view synthesis reference index may be explicitly signaled in a slice header. This design may support bi-directional prediction, where one direction is predicted with a view synthesis picture and the other direction is predicted from a normal temporal picture or inter-view reference picture. This design also supports multiple view synthesis pictures to be adapted in the slice level, as well as in the macroblock level.

However, in the current design (as set forth in the current 3D AVC reference software, referred to as 3D-ATM, as noted above), block based view synthesis prediction is done on the fly. Performing the block based view synthesis prediction "on the fly" means that a view synthesis reference block is not generated until the view synthesis block is needed. Accordingly, a view synthesis prediction picture (as reference picture) is not present, e.g., pre-generated and included in a reference picture list.

However, certain hardware for performing motion compensation may have a legacy (e.g., mature) motion compensation module that uses one reference frame and a motion vector as input. Accordingly, at least some H.264/AVC motion compensation modules currently in circulation may not be used for on the fly view synthesis prediction, because there is no pre-generated view synthesis picture as an initial input.

To compensate for the legacy hardware, rather than performing view synthesis on the fly as described above, a video coder may always generate a view synthesis picture. That is, the video coder may generate a view synthesis picture for a sequence of pictures and assign the view synthesis picture a reference picture index value in a reference picture list. However, if a view synthesis prediction picture is always generated, it is not possible to take the advantage of the block-based ("on the fly") view synthesis prediction, which may impact computational and memory efficiency. In typical cases, such a signaling process may lead to coding efficiency degradation. In addition, the reference index signaling based mechanism may require an explicit reference picture list modification command to put a view synthesis picture into a desirable position of a reference picture list, which may further impact computational efficiency.

This disclosure recognizes certain problems that may arise with conventional coding techniques, e.g., of a 3DV extension of H.264/AVC. For example, it is not possible to turn off the reference index based signaling mechanism described above for view synthesis prediction. For example, it may not be possible to turn off the current reference index based signaling mechanism of 3D-ATM without disrupting backwards compatibility goals of the 3D-ATM extension.

Accordingly, a new hardware module that supports block based view synthesis prediction may be needed for video coders. In addition, when a sequence of pictures has an associated view synthesis picture (seq_view_synthesis_flag is equal to 1), a video coder must generate additional reference index values for view synthesis pictures, so that the reference index values are available to be assigned in instances in which a view synthesis picture is generated and used for purposes of prediction. Accordingly, the video coder generates additional reference index values, even when a view synthesis picture is not actually generated during coding, impacting computational and/or coding efficiency.

According to aspects of this disclosure, a reference index of a VSP picture is not specifically indicated in a slice header or added during reference picture list construction. Instead, one or more syntax elements (e.g., a flag) may be signaled at the MB or MB partition level for each reference index that corresponds to an inter-view reference picture. This flag may indicate whether VSP is applied for the MB or MB partition for that reference index. In other words, for example, the flag may indicate whether to use an inter-view reference picture for purposes of prediction, or to use a VSP picture (e.g., generated from the inter-view reference picture) for purposes of prediction.

The flag described above is different from the traditional vsp_flag of 3D-ATM. For example, the flag described above may replace the vsp_flag of 3D-ATM. According to aspects of this disclosure, by signaling a reference index in the manner described above, different reference indexes may be used for VSP. That is, for example, any inter-view reference index may be used for VSP, rather than VSP being tied to a specific VSP reference index signaled in a slice header.

In one example, according to aspects of this disclosure, a VSP flag is only present when a reference index for the block currently being coded corresponds to an inter-view reference picture. In another example, the VSP flag may be present for any inter-predicted mode. In another example, additionally or alternatively, the flag may only be present for a reference index corresponding to RefPlicList0. In another example, additionally or alternatively, the VSP flag may be present for a reference index corresponding to both RefPlicList0 and RefPicList1 (if present).

FIG. 1 is a block diagram illustrating an example video encoding and decoding system 10 that may utilize the techniques of this disclosure for view synthesis. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for view synthesis may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a variety of video coding standards. For example, video encoder 20 and video decoder 30 may operate according to the ITU-T H.264/MPEG-4 (AVC) standard, which was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on extensions to H.264/MPEG-4 AVC. In particular, one potential standard is an H.264/AVC based 3D video coding standard that provides for coding both texture and depth for each view of video data. The main coding tools for 3DV WD4 may be described in document JCT3V-B1002, as noted above. In addition, the latest reference software may be referred to herein as ATM or 3D-ATM, as noted above.

The techniques of this disclosure, however, are not limited to any particular coding standard. Other examples of video coding standards include MPEG-2 and ITU-T H.263, and the High Efficiency Video Coding (HEVC) standard. For example, in some instances, video encoder 20 and video decoder 30 may perform multi-view video coding (MVC), and may implement a multi-view extension of HEVC, so called MV-HEVC, or a depth enhanced HEVC-based full 3DV codec, 3D-HEVC.

In H.264/AVC, each inter-predicted macroblock (MB) may be partitioned in one of four different possible ways, including one 16×16 MB partition, two 16×8 MB partitions, two 8×16 MB partitions, and four 8×8 MB partitions. The different MB partitions in one MB may have different reference index values for each direction (RefPicList0 or RefPicList1). When an MB is not partitioned into four 8×8 MB partitions, the MB may have only one motion vector for the whole MB partition in each direction. When an MB is partitioned into four 8×8 MB partitions, each 8×8 MB partition may be further partitioned into sub-blocks, each of which may have a different motion vector in each direction. There may be four ways to partition an 8×8 MB partition into sub-blocks, including one 8×8 sub-block, two 8×4 sub-blocks, two 4×8 sub-blocks, and four 4×4 sub-blocks. Each sub-block may have a different motion vector in each direction.

In general, the motion compensation loop of H.264/AVC and HEVC are the same. For example, the reconstruction of a current frame $\hat{I}$ in the motion compensation loop may equal de-quantized coefficients r plus temporal prediction P:

$$\hat{I} = r + P.$$

In the formula above, P indicates uni-predictive inter prediction for P frames or bi-predictive inter prediction for B frames.

However, the unit of motion compensation in HEVC is different from that in previous video coding standards. For example, the concept of a macroblock in previous video coding standards does not exist in HEVC. Rather, macroblocks are replaced by a flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptively. A PU is a basic unit of inter/intra-prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In any case, in video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

In some instances, pictures may be divided into a number of slices, with each slice including a number of macroblocks or coding tree units (CTUs, with respect to HEVC). A slice may include an integer number of macroblocks or CTUs ordered consecutively in a raster scan order. A coded slice may comprise a slice header and slice data. The slice header of a slice may be a syntax structure that includes syntax elements that provide information about the slice.

This disclosure may use the term "video unit" or "video block" or "block" to refer to one or more sample blocks and syntax structures used to code samples of the one or more blocks of samples. Example types of video units or blocks may include macroblocks, macroblock partitions, CTUs, CUs, PUs, transform units (TUs), and so on. Blocks of video data may generally be referred to being at the "block level," versus higher levels such as a slice level, picture level, or sequence level.

Video encoder 20 may use intra-prediction or inter prediction to generate a predictive block. If video encoder 20 uses intra-prediction to generate the predictive block, video encoder 20 may generate the predictive block based on samples of the picture associated with the block being coded. In this disclosure, the phrase "based on" may indicate "based at least in part on."

If video encoder 20 uses inter prediction to generate the predictive blocks, video encoder 20 may generate the predictive blocks based on decoded samples of one or more pictures other than the picture currently being coded. When inter prediction is used to generate the predictive blocks of a block, this disclosure may refer to the block as "inter-coded" or "inter predicted." Inter prediction may be uni-predictive (i.e., uni-prediction) or bi-predictive (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks. Moreover, when using uni-prediction, video encoder 20 may generate a single motion vector that indicates a spatial displacement between a prediction block and the reference location. The motion vector may include a horizontal component specifying a horizontal displacement between the prediction block and the reference location and may include a vertical component specifying a vertical displacement between the prediction block and the reference location.

When using bi-prediction to encode a block, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks. Moreover, when using bi-prediction, video encoder 20 may generate a first motion vector indicating a spatial displacement between a prediction block and the first reference location and a second motion vector indicating a spatial displacement between the prediction block and the second reference location.

Following intra-predictive or inter-predictive coding, video encoder 20 may calculate residual data for the block currently being coded. The residual data may correspond to pixel differences between pixels of the unencoded picture and the predictive blocks. Video encoder 20 may then transform the residual data. For example, video encoder 20 may transform the video data from the spatial domain to the transform domain by applying, e.g., a discrete cosine transform (DCT), an integer transform, a wavelet transform, or a conceptually similar transform.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 may output a bitstream that includes a sequence of bits that forms a representation of video data (i.e., coded pictures and associated data). The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL units may encapsulate different RBSPs for sequence parameter sets (SPSs), picture parameter sets (PPSs), coded slices, supplemental enhancement information (SEI) messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20.

For instance, video decoder 30 may use motion vectors to determine predictive blocks for a block currently being decoded (a current block). In addition, video decoder 30 may inverse quantize transform coefficients of the current block. Video decoder 30 may apply an inverse transform on the coefficients determine the residual data for the current block. Video decoder 30 may reconstruct the current block by adding the samples of the predictive block to corresponding residual samples. By reconstructing each of the blocks for a picture, video decoder 30 may reconstruct the picture.

In general, to perform view synthesis prediction, a video coder, such as video encoder 20 or video decoder 30, may use texture and depth information of one or more views to generate a synthesized view component. For example, VSP may refer to generating an additional, synthesized reference frame for purposes of predicting video data. A virtual version of a frame may be synthesized to be encoded from previously encoded frames of other cameras and may use the virtual frame as a prediction reference.

This process is substantially similar to the process for generating a synthesized view component using texture and depth information for purposes of display. However, in view synthesis prediction, a synthesized view component (that is, a picture) may be added to a reference picture list for use as a reference picture when coding a different view. View synthesis prediction may be used to generate reference pictures for coding texture information or depth information. Of course, the generated view synthesis pictures may also be displayed by a client device as part of playback. Additionally or alternatively, video decoder 30, or another unit of destination device 14, such as a post-processing unit (not shown), may perform view synthesis for the purposes of generating synthesized pictures for playback. It should be understood that, although view synthesis pictures used for prediction may be displayed, in some examples, a separate picture may be generated using DIBR for purposes of display. View synthesis images for the purposes of prediction may be generated during coding or "in loop," while view synthesis images for the purposes of display may be generated either "in loop" or "post loop," that is, following coding.

In order to generate an additional reference image, a 3D warping or view interpolation process may be used. For example, a 3D warping process may include performing a projection using depth information and camera parameters. A view interpolation process may include exploiting disparity information between adjacent viewpoint images. In general, for VSP, there are two types of image warping techniques, namely forward warping and backward warping, depending on the availability of the depth map of the current view. Forward warping generates the synthetic view when the depth map from the reference viewpoint is available. In this example, the depth map from the reference viewpoint is encoded/decoded before encoding/decoding the texture component of the current view. A similar derivation may be obtained for backward warping using the depth of the view to be synthesized.

In-loop VSP is supported in the current H.264/AVC-based 3D video coding standard for enhanced texture coding (WD4, noted above). To enable VSP for coding the current view, the previously coded texture and depth view components of the same access unit may be used for the view synthesis. A synthesized picture resulting from VSP is included in the initial reference picture lists (e.g., RefPicList0 and/or RefPicList1) following temporal and inter-view reference frames.

As noted above, document "3D-CE1.a: Generalized View Synthesis Prediction (GVSP) mode," Joint Collaborative Team on 3D Video Coding Extension Development of ITU-T SG 16 WP 3 and ISO/IEC JTC 1/SC 29/WG 11 2nd Meeting: Shanghai, CN, 13-19 Oct. 2012, JCT3V-B0054 proposed introducing a flag at multiple levels, macroblock or lower, to indicate whether a block is coded as skip mode and predicted from the view synthesized picture.

An example of syntax element set is set forth in Table 1-Table 3 below. For editorial convenience, the flags may be named as vsp_flag. An example of macroblock layer syntax is shown in Table 1 below:

TABLE 1

| Macroblock layer syntax | C | Descriptor |
|---|---|---|
| macroblock_layer( ) { | | |
|   if (slice_vsp_flag && VspRefExist) | | |
|     vsp_mb_flag | 2 | ae(v) |
|   if (! vsp_mb_flag ) | | |
|     mb_type | 2 | ue(v) \| ae(v) |
|   if( mb_type = = I_PCM ) { | | |
|     while( !byte_aligned( ) ) | | |
|       pcm_alignment_zero_bit | 3 | f(1) |
|     for( i = 0; i < 256; i++ ) | | |
|       pcm_sample_luma[ i ] | 3 | u(v) |
|     for( i = 0; i < 2 * MbWidthC * MbHeightC; i++ ) | | |
|       pcm_sample_chroma[ i ] | 3 | u(v) |
|   } else { | | |
|     noSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) = = 4 ) { | | |
|       if ( !vsp_mb_flag ) | | |
|         sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       if ( !vsp_mb_flag ) | | |
|         mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_mb_flag \|\| (!vsp_mb_flag && (mb_type != B_Direct_16x16 \|\| direct_8x8_inference_flag)) ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| | | |
|       MbPartPredMode( mb_type, 0 ) = = Intra_16x16 ) { | | |
|       mb_qp_delta | 2 | se(v) \| ae(v) |
|       residual( 0, 15 ) | 3 \| 4 | |
|     } | | |
|   } | | |
| } | | |

In the example of Table 1 above, vsp_mb_flag equal to 1 indicates that the whole MB is predicted from a VSP picture. This flag equal to 0 indicates that the whole MB may be predicted by other modes. When this flag is equal to 1, the mb_type is not signalled. When not present, it is inferred to be equal to 0.

An example of macroblock prediction syntax is shown in Table 2 below:

TABLE 2

Macroblock prediction syntax

| mb_pred( mb_type ) { | C | Descriptor |
|---|---|---|
|    if( MbPartPredMode( mb_type, 0 ) = = Intra_4x4 \|\| <br>      MbPartPredMode( mb_type, 0 ) = = Intra_16x16 ) { <br>     if( MbPartPredMode( mb_type, 0 ) = = Intra_4x4 ) <br>      for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) <br>          rem_intra4x4_pred_mode[ luma4x4BlkIdx ] | 2 | u(3) \| ae(v) |
|        } <br>     intra_chroma_pred_mode | 2 | ue(v) \| ae(v) |
|    } else if( MbPartPredMode( mb_type, 0 ) != Direct ) { <br>     for( mbPartIdx = 0; mbPartIdx < NumMbPart( mb_type ); mbPartIdx++) <br>      if (slice_vsp_flag && NumMbPart( mb_type ) != 1 && VspRefExist) //vsp_mb_flag is not 1 | | |
|        mb_part_vsp_flag[ mbPartIdx ] | 2 | ae(v) |
|       if(!mb_part_vsp_flag[ mbPartIdx ] &&( <br>num_ref_idx_l0_active_minus1 > 0 \|\| <br>        mb_field_decoding_flag ) && <br>        MbPartPredMode( mb_type, mbPartIdx ) != Pred_L1 ) | | |
|        ref_idx_l0[ mbPartIdx ] | 2 | te(v) \| ae(v) |
|      for (mbPartIdx = 0; mbPartIdx < NumMbPart( mb_type ) && !mb_part_vsp_flag[ mbPartIdx ]; mbPartIdx++) <br>      if( ( num_ref_idx_l1_active_minus1 > 0 \|\| <br>        mb_field_decoding_flag ) && <br>        MbPartPredMode( mb_type, mbPartIdx ) != Pred_L0 ) | | |
|        ref_idx_l1[ mbPartIdx ] | 2 | te(v) \| ae(v) |
|      for( mbPartIdx = 0; mbPartIdx < NumMbPart( mb_type ); mbPartIdx++) <br>      if(!mb_part_vsp_flag[ mbPartIdx ] && <br>MbPartPredMode ( mb_type, mbPartIdx ) != Pred_L1 ) <br>       for( compIdx = 0; compIdx < 2; compIdx++ ) <br>        mvd_l0[ mbPartIdx ][ 0 ][ compIdx ] | 2 | se(v) \| ae(v) |
|      for( mbPartIdx = 0; mbPartIdx < NumMbPart( mb_type ); mbPartIdx++) <br>      if(!mb_part_vsp_flag[ mbPartIdx ] && <br>MbPartPredMode( mb_type, mbPartIdx ) != Pred_L0 ) <br>       for( compIdx = 0; compIdx < 2; compIdx++ ) <br>        mvd_l1[ mbPartIdx ][ 0 ][ compIdx ] | 2 | se(v) \| ae(v) |
|    } <br>} | | |

In the example of Table 2 above, mb_part_vsp_flag [mbPartIdx] equal to 1 indicates that the current MB partition is predicted from a VSP picture. This flag equal to 0 indicates that the whole MB partition is not predicted from a VSP picture. When this flag is not present, this flag is inferred to be equal to 0.

In some examples, if the number of MB partition is less than 4, noSubMbPartSizeLessThan8×8Flag is true (the same as in H.264/AVC). If number of MB partition is equal to 4, a noSubMbPartSizeLessThan8×8Flag syntax element may be derived by checking the 8×8 MB partitions with mb_part_vsp_flag equal to 0, as follows:

1. If any MB partition has a Sub-mb partition smaller than 8×8, noSubMbPartSizeLessThan8×8Flag is false, return
2. noSubMbPartSizeLessThan8×8Flag is true.

An example of sub-macroblock prediction syntax is shown in Table 3 below:

TABLE 3

Sub-macroblock prediction syntax

| sub_mb_pred( mb_type ) { | C | Descriptor |
|---|---|---|
|   for( mbPartIdx = 0; mbPartIdx < 4; mbPartIdx++ ) { <br>    if (slice_vsp_flag && VspRefExist) // vsp_mb_flag is not 1 <br>      sub_mb_vsp_flag[ mbPartIdx ] <br>    if (!sub_mb_vsp_flag[ mbPartIdx ]) | | |
|       sub_mb_type[ mbPartIdx ] | 2 | ue(v) \| ae(v) |

TABLE 3-continued

Sub-macroblock prediction syntax

| sub_mb_pred( mb_type ) { | C | Descriptor |
|---|---|---|
| }<br>　for( mbPartIdx = 0; mbPartIdx < 4; mbPartIdx++ )<br>　　if(!sub_mb_vsp_flag[ mbPartIdx ] &&(<br>num_ref_idx_l0_active_minus1 > 0 ⎮ ⎮<br>mb_field_decoding_flag ) &&<br>　　　mb_type != P_8x8ref0 &&<br>　　　sub_mb_type[ mbPartIdx ] != B_Direct_8x8 &&<br>　　　SubMbPredMode( sub_mb_type[ mbPartIdx ] ) !=<br>Pred_L1 ) | | |
| 　　　　ref_idx_l0[ mbPartIdx ] | 2 | te(v) ⎮ ae(v) |
| 　for( mbPartIdx = 0; mbPartIdx < 4; mbPartIdx++ )<br>　　if(!sub_mb_vsp_flag[ mbPartIdx ] &&<br>(num_ref_idx_l1_active_minus1 > 0 ⎮ ⎮<br>mb_field_decoding_flag ) &&<br>　　　sub_mb_type[ mbPartIdx ] != B_Direct_8x8 &&<br>　　　SubMbPredMode( sub_mb_type[ mbPartIdx ] ) !=<br>Pred_L0 ) | | |
| 　　　　ref_idx_l1[ mbPartIdx ] | 2 | te(v) ⎮ ae(v) |
| 　for( mbPartIdx = 0; mbPartIdx < 4; mbPartIdx++ )<br>　　if(!sub_mb_vsp_flag[ mbPartIdx] &&(<br>sub_mb_type[ mbPartIdx ] != B_Direct_8x8 &&<br>　　　SubMbPredMode( sub_mb_type[ mbPartIdx ] ) !=<br>Pred_L1 )<br>　　　for( subMbPartIdx = 0;<br>　　　　　subMbPartIdx <<br>NumSubMbPart( sub_mb_type[ mbPartIdx ] );<br>　　　　　subMbPartIdx++)<br>　　　　for( compIdx = 0; compIdx < 2; compIdx++ ) | | |
| 　　　　　　mvd_l0[ mbPartIdx ][ subMbPartIdx ][ compIdx ] | 2 | se(v) ⎮ ae(v) |
| 　for( mbPartIdx = 0; mbPartIdx < 4; mbPartIdx++ )<br>　　if(!sub_mb_vsp_flag[ mbPartIdx ]<br>&&sub_mb_type[ mbPartIdx ] != B_Direct_8x8 &&<br>　　　SubMbPredMode( sub_mb_type[ mbPartIdx ] ) !=<br>Pred_L0 )<br>　　　for( subMbPartIdx = 0;<br>　　　　　subMbPartIdx <<br>NumSubMbPart( sub_mb_type[ mbPartIdx ] );<br>　　　　　subMbPartIdx++)<br>　　　　for( compIdx = 0; compIdx < 2; compIdx++ ) | | |
| 　　　　　　mvd_l1[ mbPartIdx ][ subMbPartIdx ][ compIdx ] | 2 | se(v) ⎮ ae(v) |
| } | | |

In the example of Table 3 above, sub_mb_vsp_flag[mbPartIdx] equal to 1 indicates that the current MB partition (8×8) is predicted from a VSP picture. This flag equal to 0 indicates that the whole MB partition is not predicted from a VSP picture. When not present, this flag is inferred to be equal to 0.

To simplify view synthesis, in some examples, view synthesis prediction may be unified with motion vector prediction. In such examples, view synthesis prediction may be simplified to performing backward warping only and not performing any additional view synthesis techniques such as hole-filling. In addition, a disparity value or depth value is applied to an entire 4×4 block. Accordingly, it is possible to simplify view synthesis prediction to use traditional motion compensation techniques, such that the motion vector is derived from depth or disparity and is associated with each 4×4 block of a MB, MB partition, or sub-MB partition. This simplified view synthesis process may be referred to as a unified VSP mode.

As noted above, signaling of view synthesis prediction may be based on a traditional reference index, which is transparent to the H.264/AVC design in terms of MB level signaling. For example, for each MB, a video coder may determine whether to use view synthesis based on a reference index identifying the view synthesis picture in a reference picture list, and the view synthesis reference index may be explicitly signaled in a slice header. This design may support bi-directional prediction, where one direction is predicted with a view synthesis picture and the other direction is predicted from a normal temporal picture or inter-view reference picture. This design also supports multiple view synthesis pictures to be adapted in the slice level, as well as in the macroblock level.

It is not possible to turn off the current reference index based signaling mechanism of 3D-ATM. For example, it may not be possible to turn off the current reference index based signaling mechanism of 3D-ATM without disrupting backwards compatibility goals of the 3D-ATM extension. Accordingly, a new hardware module that supports block based view synthesis prediction may be needed for video coders. In addition, when a sequence of pictures has an associated view synthesis picture (seq_view_synthesis_flag is equal to 1), a video coder must generate additional reference index values for view synthesis pictures, so that the reference index values are available to be assigned in instances in which a view synthesis picture is generated and used for purposes of prediction. Accordingly, the video coder generates additional reference index values, even when a view synthesis picture is not actually generated during coding, impacting computational and/or coding efficiency.

Aspects of this disclosure include techniques for indicating whether to apply view synthesis prediction when coding a block of video data. In an example, a video coder, such as video encoder 20 and/or video decoder 30, may determine whether a reference index for a current block corresponds to an inter-view reference picture, and when the reference index for the current block corresponds to the inter-view reference picture, determine data indicating a VSP mode of the current block, where the VSP mode for the reference index indicates whether the current block is predicted using view synthesis prediction from the inter-view picture (e.g., from at least a portion of a picture synthesized from the inter-view picture). In instances in which the video coder is configured as video decoder 30, video decoder 30 may determine the data indicating the VSP mode by obtaining the data from an encoded bitstream.

Accordingly, in the example above, a reference index of a VSP picture is not specifically indicated in a slice header or added during reference picture list construction. Instead, video encoder 20 may encode (and video decoder 30 may obtain and decode, from an encoded bitstream) one or more syntax elements at the MB or MB partition level for each reference index that corresponds to an inter-predicted reference picture. As described herein, an inter-prediction reference picture is generally associated with an inter-prediction mode. That is, an inter-prediction picture may include an intra-view reference picture or an inter-view reference picture.

In some examples, the one or more syntax elements may be a VSP flag. For example, the flag may indicate whether VSP is applied for the MB or MB partition for a particular reference index. In other words, for example, the flag may indicate whether to use an inter-view reference picture for purposes of prediction, or to use a VSP picture for purposes of prediction.

In one example, according to aspects of this disclosure, video encoder 20 may only encode a VSP flag when a reference index for predictively coding a block corresponds to an inter-view reference picture. In another example, video encoder 20 may encode the VSP flag for any inter-predicted mode. In another example, additionally or alternatively, video encoder 20 may encode the flag only for a reference index corresponding to RefPlicList0. In still another example, video encoder 20 may encode the flag for a reference index corresponding to both RefPlicList0 and RefPicList1 (if present).

According to other aspects of this disclosure, when view synthesis prediction is enabled, video encoder 20 may encode (and video decoder 30 may obtain, from an encoded bitstream) one or more syntax elements in a parameter set, such as an SPS or SPS extension indicating whether reference based signaling is used for VSP (e.g., in which a reference picture index is generated for a view synthesis reference picture and VSP is performed based on the reference index), e.g., a first VSP mode, or whether GVSP is used for VSP (e.g., in which VSP is performed based on the macroblock signaling described above, for example, with respect to Tables 1-3 above), e.g., a second VSP mode. In some examples, the one or more syntax elements may include a flag in an SPS extension.

According to other aspects of this disclosure, when reference index based signaling is not used, a reference picture list modification (RPLM) process should not contain any RPLM command that corresponds to a VSP picture. For example, reference picture list construction may include the following steps: (1) the reference picture list initialization process for temporal (intra-view) reference pictures as specified in AVC is applied (2) inter-view and/or synthesized reference pictures are appended to the end of the list, and (3) an RPLM process is applied to reorder the reference pictures in the reference picture list. Video encoder 20 may output one or more RPLM commands that instruct video decoder 30 to apply the RPLM process. Video decoder 30 may apply the RPLM process in response to the RPLM commands.

According to aspects of this disclosure, when reference index based signaling is not used, video encoder 20 and video decoder 30 may not issue an RPLM command that corresponds to a VSP picture. That is, video encoder 20 and video decoder 30 may refrain from using an RPLM to change the position of a VSP picture, because no VSP picture has been generated.

According to other aspects of this disclosure, when GVSP is used, video encoder 20 and video decoder 30 may synthesize a view synthesis prediction picture from only the first inter-view reference picture for RefPicList0. In this example, no signaling of the view synthesis prediction picture is needed, and it is automatically determined (e.g., inferred) that the GVSP mode outputs a disparity motion vector pointing to the first inter-view reference picture, e.g., RefPicList0. Alternatively, in another example, video encoder 20 and video decoder 30 may perform view synthesis prediction based on an inter-view picture in RefPicList1. Alternatively, in another example, video encoder 20 and video decoder 30 may perform view synthesis prediction based on inter-view pictures if present, in both RefPicList0 and RefPicList1.

Figure 2:
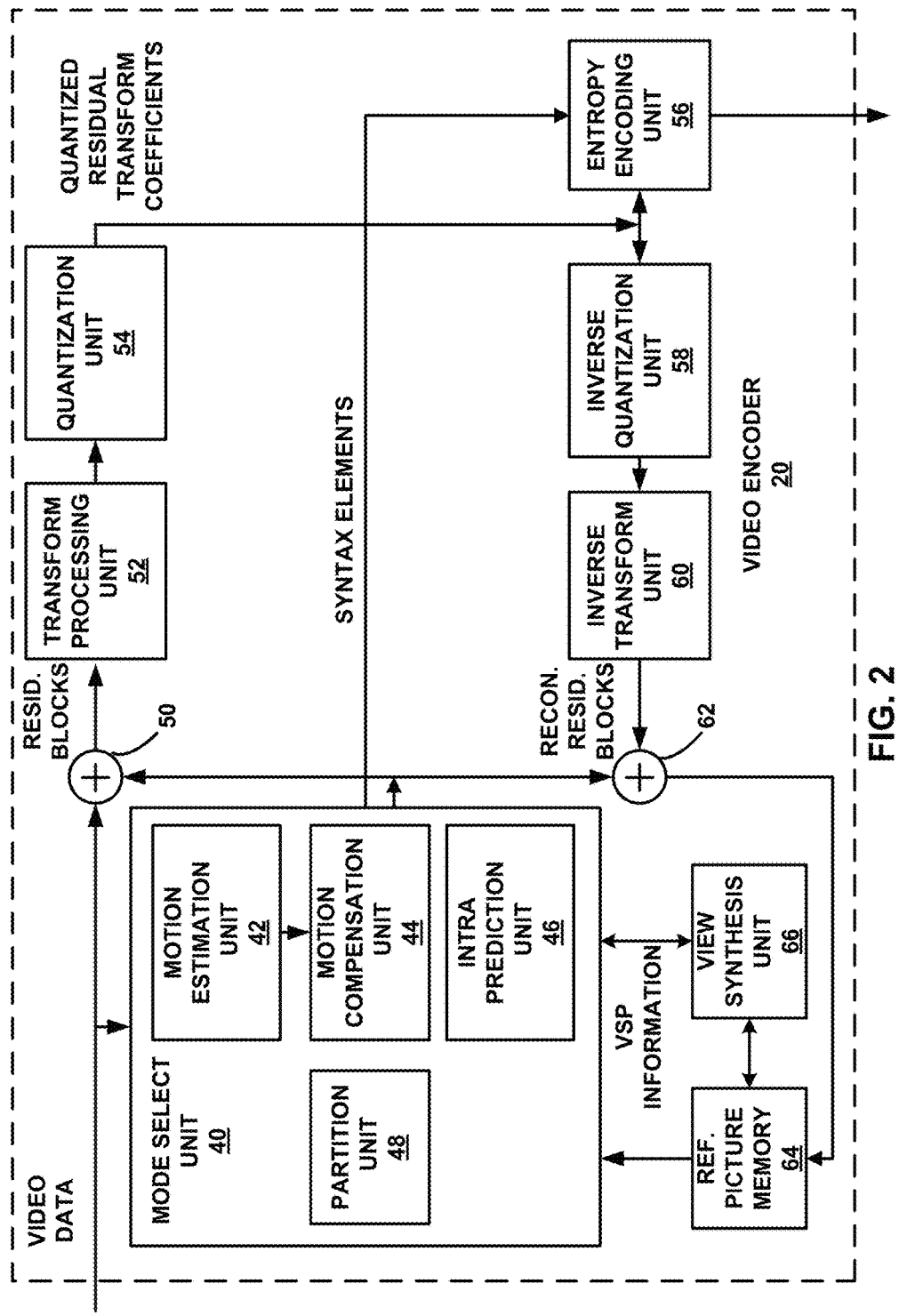
FIG. 2 is a block diagram illustrating an example video encoder that may implement the techniques described in this disclosure.

FIG. 2 is a block diagram illustrating an example video encoder 20 that may implement the techniques described in this disclosure for view synthesis. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As noted above, video encoder 20 may be adapted to perform multiview video coding. In addition to encoding texture maps (i.e., luma and chroma values) for each view, video encoder 20 may further encode a depth map for each view.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into blocks (e.g., macroblocks or LCUs), and partition each of the blocks sub-blocks based on rate-distortion analysis (e.g., rate-distortion optimization).

Mode select unit 40 may select one of the coding modes, such as intra, temporal inter, or inter-view prediction, e.g., based on error results, and provides a predicted block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

In some examples, mode select unit 40 may be configured to select inter-view prediction, e.g., relative to a previously coded view or to a synthesized view for view synthesis prediction. As discussed in greater detail below, view synthesis unit 66 may be configured to synthesize a view (that is, synthesize pictures, including texture and/or depth pixel values) for view synthesis prediction. For example, view synthesis unit 66 may be configured to perform techniques substantially similar to depth-image based rendering (DIBR).

It should be understood that where view synthesis prediction is enabled, mode select unit 40 may still select from among the other available coding modes, e.g., intra-prediction, temporal inter-prediction, or inter-view prediction relative to a previously coded picture. Thus, video encoder 20 may provide an indication of which coding mode is selected for a block of video data, separate from information indicating whether view synthesis prediction is enabled.

Motion estimation unit 42 and motion compensation unit 44 (as well as one or more other units of video encoder 20) may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. Motion vectors may include temporal motion vectors, which describe motion of a block relative to a previously coded block of the same view in a temporally distinct picture, and disparity motion vectors, which describe disparity between similar blocks in different views (having different horizontal camera perspectives) but that may have the same temporal position. In some cases, motion vectors may describe motion with respect to a temporally distinct picture that is also in a different view.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

When performing inter-view prediction, motion estimation unit 42 may calculate disparity motion vectors relative to either previously coded pictures of a different view or synthesized pictures for view synthesis prediction. Thus, motion estimation unit 42 may also be referred to as a motion/disparity estimation unit.

In general, synthesized pictures may be stored in reference picture memory 64 by view synthesis unit 66, and therefore, motion estimation unit 42 and motion compensation unit 44 need not be configured to determine whether a reference picture is a previously coded picture of a different view or a synthesized picture from a view synthesis process. The process for searching for a disparity motion vector may be restricted to searching horizontally, rather than both horizontally and vertically, because pictures of different views at the same temporal position typically only include horizontal differences and not vertical differences due to pictures of a scene being captured or generated from disparate horizontal camera perspectives.

Motion estimation unit 42 calculates a motion vector (e.g., a temporal motion vector or a disparity motion vector) for a video block in an inter-coded slice by comparing the position of the block to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42, which again may be a temporal motion vector or a disparity motion vector. Again, motion estimation unit 42 and motion compensation unit 44 may be functionally integrated, in some examples. Upon receiving the motion vector for the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below.

In general, motion estimation unit 42 performs motion estimation relative to luma components, and motion compensation unit 44 uses motion vectors calculated based on the luma components for both chroma components and luma components. Motion estimation unit 42 and motion compensation unit 44 may be configured to either reuse motion vectors from luma components to code depth maps, or to independently calculate motion vectors for depth maps. Thus, in some cases, motion estimation 42 and motion compensation unit 44 may be configured to predict depth maps in a manner similar to chroma components or in a manner similar to luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction (e.g., temporal inter-prediction and/or inter-view prediction) performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Moreover, as noted above, mode select unit 40 may determine whether to utilize view synthesis prediction to code a particular block of a non-base view. Mode select unit 40 may receive configuration data that indicates whether view synthesis prediction is enabled for a bitstream or for a particular operation point of a multi-view bitstream. For example, a user may have provided configuration data indicating that the bitstream is to be compatible with devices that are not equipped to perform view synthesis prediction, in which case mode select unit 40 may disable view synthesis prediction for the entire bitstream. Alternatively, the configuration data may indicate a subset of views, forming an operation point, for which view synthesis prediction is disabled, in which case mode select unit 40 may disable view synthesis prediction for each of the views in the subset, but test view synthesis prediction for other views of the bitstream not included in the subset.

In general, assuming that view synthesis prediction is permitted for a particular non-base view, mode select unit 40 may test view synthesis prediction for blocks of pictures of the non-base view to determine whether view synthesis prediction yields better performance than other coding modes, e.g., temporal inter-prediction, intra-prediction, and/or inter-view prediction relative to a previously coded (non-synthesized) view. Mode select unit 40 may test the performance of various coding modes using rate-distortion optimization (RDO), and/or using Bjontegaard-Delta rates (BD-rates). In general, rate-distortion optimization is a measure of the number of bits needed to code a set of video data using a particular mode or combination of modes, relative to the amount of distortion introduced by the mode or combination of modes. Mode select unit 40 may select the mode or combination of modes that yield the best performance as indicated by these measures.

Furthermore, mode select unit 40 may determine a number of blocks in a slice, picture, sequence, or other coded unit (e.g., a tile or wavefront) for which view synthesis prediction yields the best performance, and determine whether this number of blocks is sufficiently high to justify the processing expense of using view synthesis prediction. For example, synthesizing a view by a video decoder may require a fairly large amount of processing resources, and therefore, mode select unit 40 may select a different coding mode for a particular block aside from view synthesis prediction if there are not a sufficiently large number of blocks in the coded unit for which view synthesis prediction is to be used.

View synthesis unit 66 represents a unit that synthesizes views for inter-view prediction. When view synthesis prediction is enabled, view synthesis unit 66 may synthesize a picture for a synthesized view using texture and depth information stored in reference picture memory 64. View synthesis unit 66 may use one or more reference views to synthesize another view.

In general, to synthesize a picture, view synthesis unit 66 may use texture and depth information of one or more previously coded views. View synthesis unit 66 may calculate horizontal disparity for the texture information based on the corresponding (e.g., substantially co-located) depth information of a texture picture and a corresponding depth map. In general, objects that are to appear at the depth of the display (e.g., at the plane of convergence) may have a disparity of zero. That is, pixels representative of this object may have substantially the same horizontal position in the synthesized view as in the reference view. For objects to be displayed in front of the screen, a positive disparity may be assigned, such that in a "left eye" picture, pixels for the object are positioned to the right of corresponding pixels in the "right eye" picture. Alternatively, for objects to be displayed behind the screen, a negative disparity may be assigned, such that in a "left eye" picture, pixels for the object are positioned to the left of corresponding pixels in the "right eye" picture. The relative horizontal shift may be determined as a function of the amount of depth to be achieved, the relative horizontal offset, distance to the convergence plane, real-world distances, camera parameters, and the like.

In this manner, view synthesis unit 66 may synthesize a picture of a view to be used as a reference picture. View synthesis unit 66 may use similar processes to synthesize either or both of a texture image and/or a depth map. Thus, video encoder 20 may code a texture image and/or a depth map relative to a synthesized view component, e.g., a synthesized texture image or a synthesized depth map. View synthesis unit 66 may store data for the synthesized view component in reference picture memory 64. In this manner, mode select unit 40, motion estimation unit 42, and motion compensation unit 44 may treat the synthesized view component as if the synthesized view component were a conventional reference picture.

According to aspects of this disclosure, mode select unit 40 may generate one or more syntax elements indicating whether to apply VSP for coding a particular block. In some examples, mode select unit 40 may only generate the syntax elements for blocks that are inter-predicted, such as inter-view predicted. Thus, in this example, when a reference picture index for the current block corresponds to an inter-view reference picture, mode select unit 40 may send a flag to entropy encoding unit 56 to indicate whether VSP is used for coding the current block.

In the example above, a reference index of a VSP picture is not specifically indicated in a slice header or added during reference picture list construction. Instead, video encoder 20 may encode a flag at the MB or MB partition level for each reference index that corresponds to an inter-view reference picture. Such signaling may provide or a more flexible approach to VSP signaling, in that the synthesized picture is not tied to a particular reference picture index.

In another example, mode select unit 40 may generate the VSP flag for any inter-predicted mode. In another example, additionally or alternatively, mode select unit 40 may generate the flag only for a reference index corresponding to RefPlicList0. In still another example, mode select unit 40 may generate the flag for a reference index corresponding to both RefPlicList0 and RefPicList1 (if present).

According to other aspects of this disclosure, when view synthesis prediction is enabled, mode select unit 40 may generate one or more syntax elements for a parameter set, such as an SPS or SPS extension indicating whether reference based signaling is used for VSP (e.g., in which a reference picture index is generated for a view synthesis reference picture and VSP is performed based on the reference index) or whether GVSP is used for VSP (e.g., in which VSP is performed based on the macroblock signaling described above, for example, with respect to Tables 1-3 above). In some examples, the one or more syntax elements may include a flag in an SPS extension.

According to other aspects of this disclosure, when reference index based signaling is not used, video encoder 20 may not issue any RPLM command that corresponds to a VSP picture.

According to other aspects of this disclosure, when GVSP is used, view synthesis unit 66 may synthesize a view synthesis prediction picture from only the first inter-view reference picture for RefPicList0. In this example, no signaling of the view synthesis prediction picture is needed, and it is automatically determined (e.g., inferred) that the GVSP mode outputs a disparity motion vector pointing to the first inter-view reference picture, e.g., RefPicList0. Alternatively, in another example, view synthesis unit 66 may perform view synthesis prediction based on an inter-view picture in RefPicList1. Alternatively, in another example, view synthesis unit 66 may perform view synthesis prediction based on inter-view pictures if present, in both RefPicList0 and RefPicList1.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

According to aspects of this disclosure, video encoder 20 may perform a method including determining whether a reference index for a current block corresponds to an inter-view reference picture, and when the reference index for the current block corresponds to the inter-view reference picture, generate data indicating a view synthesis prediction (VSP) mode of the current block, wherein the VSP mode for the reference index indicates whether the current block is predicted with view synthesis prediction from the inter-view reference picture. Video encoder 20 is also configured to encode the data indicating the VSP mode in a bitstream.

Figure 3:
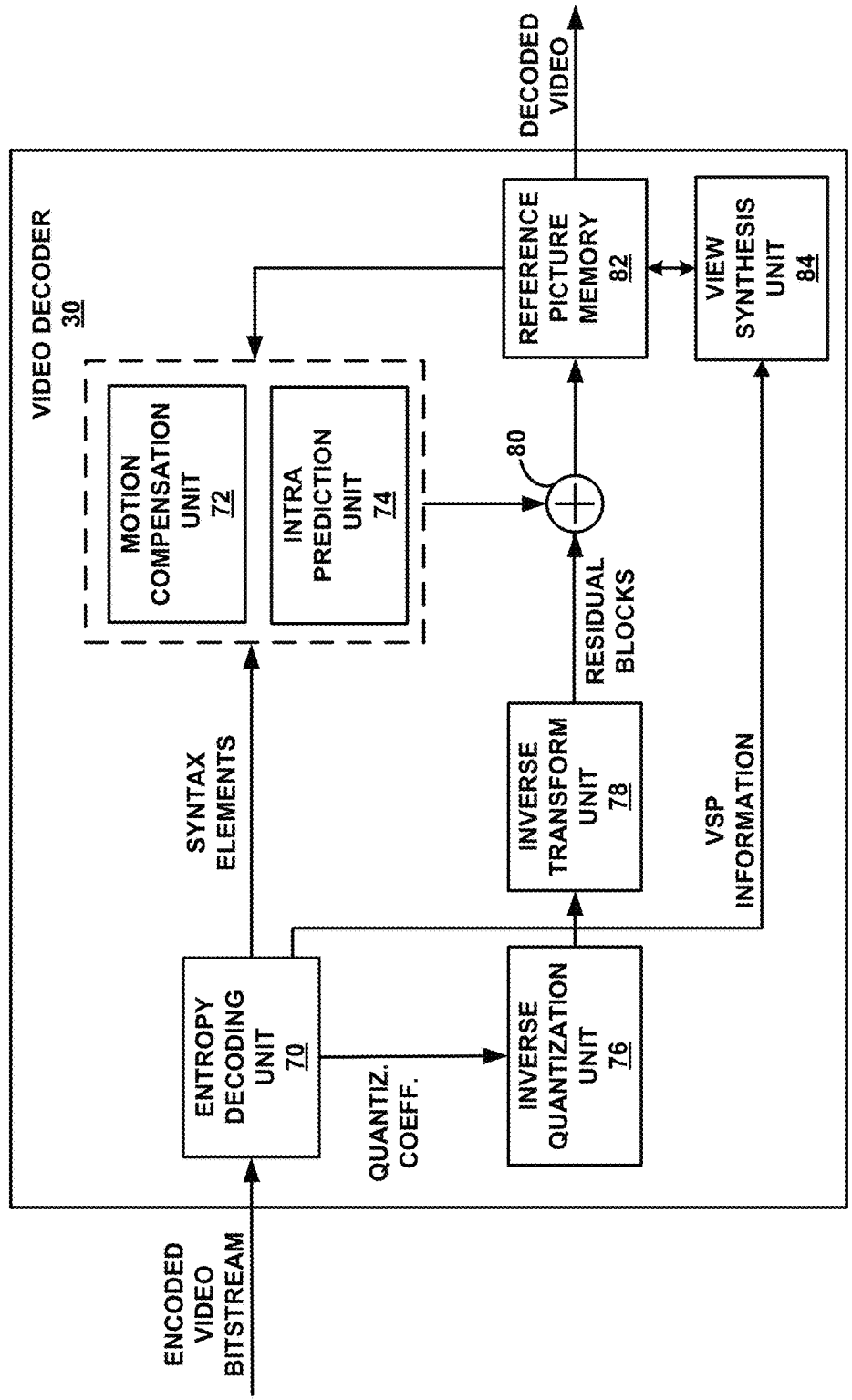
FIG. 3 is a block diagram illustrating an example video decoder that may implement the techniques described in this disclosure.

FIG. 3 is a block diagram illustrating an example of video decoder 30 that may implement techniques for coding information related to view synthesis prediction. In the example of FIG. 3, video decoder 30 includes an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In some examples, video decoder 30 may receive syntax information indicating whether view synthesis prediction is enabled for any or all of a sequence of pictures, an individual picture, a slice, a tile, or a wavefront. Entropy decoding unit 70 may decode the syntax information and send information indicating whether view synthesis prediction is enabled to view synthesis unit 84.

View synthesis unit 84 may be configured to operate in a manner substantially similar to that of view synthesis unit 66 (FIG. 2). For example, when view synthesis prediction is enabled, view synthesis unit 84 may use texture and depth information of previously decoded pictures, stored in reference picture memory 82, to generate a reference picture using view synthesis, that is, a view synthesis reference picture. View synthesis unit 84 may store the synthesized picture in reference picture memory 82. When view synthesis prediction is not enabled, view synthesis unit 84 need not generate a picture, which may conserve processing resources and/or battery power.

According to aspects of this disclosure, entropy decoding unit 70 may receive and decode one or more syntax elements indicating whether to apply VSP for coding a particular block. In some examples, the syntax elements may only be generated for blocks that are inter-predicted, such as inter-view predicted. Thus, in this example, when a reference picture index for the current block corresponds to an inter-view reference picture, view synthesis unit 84 may receive a flag indicating whether VSP is used for coding the current block.

In the example above, a reference index of a VSP picture is not specifically indicated in a slice header or added during reference picture list construction. Instead, video decoder 30 decodes a flag at the MB or MB partition level for each reference index that corresponds to an inter-view reference picture. Such signaling may provide or a more flexible approach to VSP signaling, in that the synthesized picture is not tied to a particular reference picture index.

In another example, entropy decoding unit 70 may receive and decode the VSP flag for any inter-predicted mode. In another example, additionally or alternatively, entropy decoding unit 70 may receive and decode the flag only for a reference index corresponding to RefPlicList0. In still another example, entropy decoding unit 70 may receive and decode the flag for a reference index corresponding to both RefPlicList0 and RefPicList1 (if present).

According to other aspects of this disclosure, when view synthesis prediction is enabled, video decoder 30 may receive and decode one or more syntax elements in a parameter set, such as an SPS or SPS extension indicating whether reference based signaling is used for VSP (e.g., in which a reference picture index is generated for a view synthesis reference picture and VSP is performed based on the reference index) or whether GVSP is used for VSP (e.g., in which VSP is performed based on the macroblock signaling described above, for example, with respect to Tables 1-3 above). In some examples, the one or more syntax elements may include a flag in an SPS extension.

According to other aspects of this disclosure, when reference index based signaling is not used, video decoder 30 may not perform any RPLM command that corresponds to a VSP picture.

According to other aspects of this disclosure, when GVSP is used, view synthesis unit 84 may synthesize a view synthesis prediction picture from only the first inter-view reference picture for RefPicList0. In this example, no signaling of the view synthesis prediction picture is needed, and it is automatically determined (e.g., inferred) that the GVSP mode outputs a disparity motion vector pointing to the first inter-view reference picture, e.g., RefPicList0. Alternatively, in another example, view synthesis unit 84 may perform view synthesis prediction based on an inter-view picture in RefPicList1. Alternatively, in another example, view synthesis unit 84 may perform view synthesis prediction based on inter-view pictures if present, in both RefPicList0 and RefPicList1.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra-prediction, temporal inter-prediction, or inter-view prediction) used to code the video blocks of the video slice, an inter-prediction slice type (e.g., B slice, P slice, or GPB slice), construction information for one or more of the reference picture lists for the slice, motion vectors (e.g., disparity motion vectors and/or temporal motion vectors) for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In some examples, motion compensation unit 72 may perform inter-view prediction using disparity motion vectors. Such inter-view prediction may be relative to a previously decoded picture of another view or relative to a reference picture generated using view synthesis, assuming that view synthesis prediction is enabled. Accordingly, motion compensation unit 72 may be referred to as motion/disparity compensation unit 72.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 or intra-prediction unit 74 generates the predictive block for the current video block based on the motion vectors and other syntax elements, video decoder 30 forms a decoded video block by summing the residual blocks from inverse transform unit 78 with the corresponding predictive block. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to determine whether a reference index for the current block corresponds to an inter-view reference picture, and when the reference index for the current block corresponds to the inter-view reference picture, obtain, from an encoded bitstream, data indicating a view synthesis prediction (VSP) mode of the current block, where the VSP mode for the reference index indicates whether the current block is predicted with view synthesis prediction from the inter-view reference picture.

Figure 4:
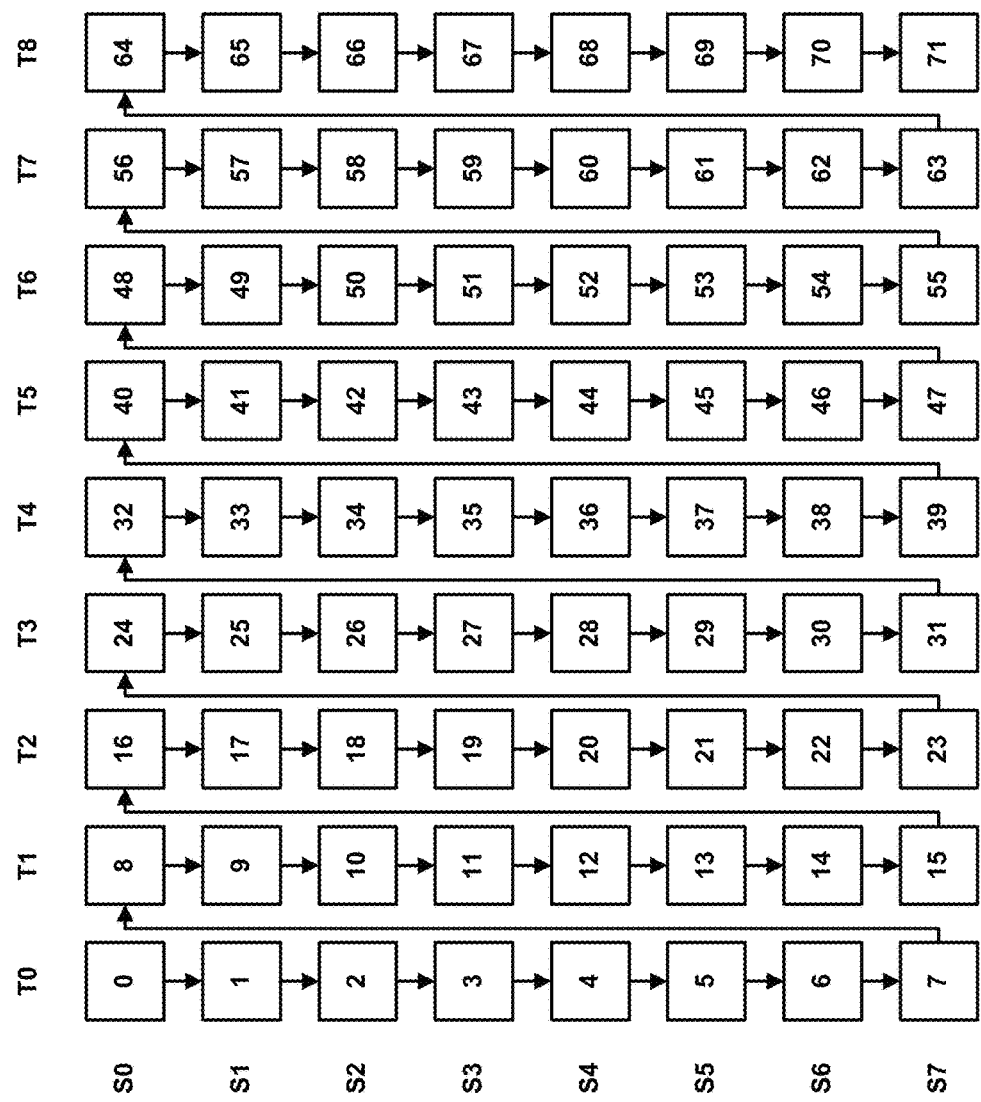
FIG. 4 is a conceptual diagram illustrating coding a Multi-view Video Coding (MVC) sequence.

FIG. 4 illustrates a typical MVC decoding order (i.e. bitstream order). The decoding order arrangement is referred as time-first coding. Each access unit is defined to contain the coded pictures of all the views for one output time instance. The decoding order of access units may not be identical to the output or display order.

Figure 5:
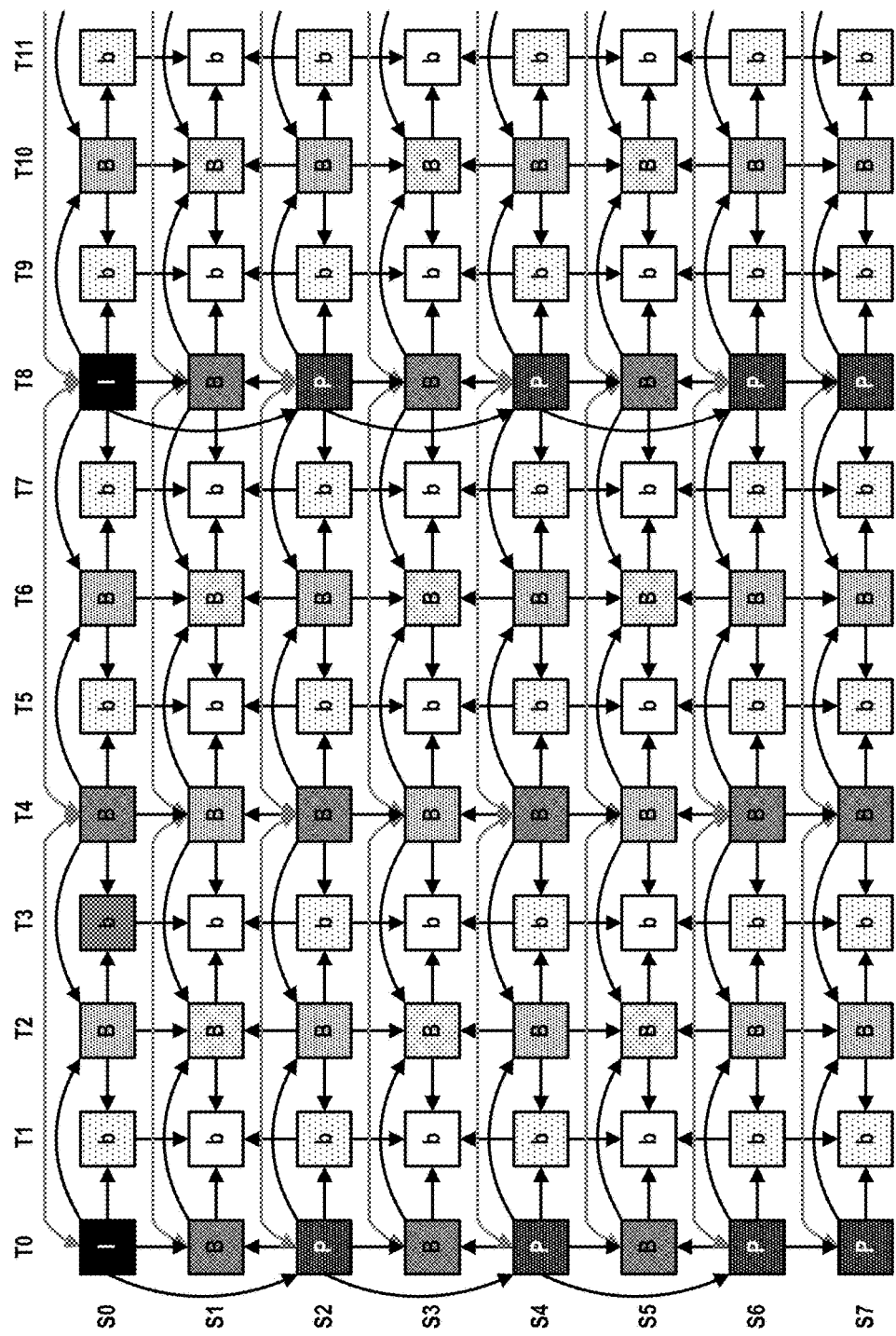
FIG. 5 is a conceptual diagram illustrating an example MVC prediction pattern.

FIG. 5 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

Pictures in FIG. 5 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multi-view video encoding, pictures may be inter-view predicted. That is, a view component can use the view components in other views for reference. In MVC, for example, inter-view prediction is realized as if the view component in another view is an inter-prediction reference. The potential inter-view references may be signaled in the Sequence Parameter Set (SPS) MVC extension and may be modified by the reference picture list construction process, which enables flexible ordering of the inter-prediction or inter-view prediction references.

FIG. 5 provides various examples of inter-view prediction. Pictures of view S1, in the example of FIG. 5, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 5, capital "B" and lowercase "b" are intended to indicate different hierarchical relationships between pictures, rather than different encoding methodologies. In general, capital "B" frames are relatively higher in the prediction hierarchy than lowercase "b" frames. FIG. 5 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 5 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

In MVC, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. Note both of these sub-bitstreams can be decoded as independent MVC bitstreams and can be supported simultaneously.

Accordingly, a typical MVC prediction (including both inter-picture prediction within each view and inter-view prediction) structure for multi-view video coding is shown in FIG. 5, where predictions are indicated by arrows, the pointed-to object using the point-from object for prediction reference. In MVC, the inter-view prediction is supported by disparity motion compensation, which uses the syntax of the H.264/AVC motion compensation, but allows a picture in a different view to be used as a reference picture.

Coding of two views could be supported also by MVC, and one of the potential advantages of MVC is that an MVC encoder could take more than two views as a 3D video input and an MVC decoder can decode such a multiview representation. Accordingly, any renderer with MVC decoder may expect 3D video contents with more than two views.

With respect to inter-view prediction, in MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

Views S0 to S7 of FIG. 4 represent examples of coded views, that is, views for which coded information is provided in a bitstream. In some examples, additional views may be synthesized between views S0 to S7. For example, a view may be synthesized between views S0 and S1. To synthesize a picture of such a view, texture and/or depth information of pictures in views S0 and S2 may be used. For example, to synthesize a reference picture at time T1, texture and depth information from the pictures at time T1 from views S0 and/or S2 may be used. A video coder, such as video encoder 20 or video decoder 30, may interpolate pixel data for such a picture of a synthesized view to be used as a reference for coding another picture, e.g., a picture of view S1 at time T1.

Aspects of this disclosure include techniques for indicating whether to apply view synthesis prediction when coding a block of video data. In an example, a video coder, such as video encoder 20 and/or video decoder 30, may determine whether a reference index for a current block corresponds to an inter-prediction reference picture, and when the reference index for the current block corresponds to the inter-prediction reference picture, determine data indicating a VSP mode of the current block, where the VSP mode for the reference index indicates whether the current block is predicted using view synthesis prediction, e.g., from an inter-view reference picture. In instances in which the video coder is configured as video decoder 30, video decoder 30 may determine the data indicating the VSP mode by obtaining the data from an encoded bitstream.

In some examples, the inter-prediction reference picture is generally associated with an inter-prediction mode. In such examples, the data indicating the VSP mode may be determined for any inter-mode, e.g., for intra-view reference pictures and inter-view reference pictures. In other examples, the data indicating the VSP mode may only be determined for inter-view reference pictures. That is, for example, video decoder 30 may only decode the data indicating the VSP mode when a reference picture index corresponds to an inter-view reference picture.

In the example above, a reference index of a VSP picture is not specifically indicated in a slice header or added during reference picture list construction. Instead, the video coder may code one or more syntax elements at the MB or MB partition level for each reference index that corresponds to an inter-prediction reference picture. In some examples, the one or more syntax elements may be a VSP flag. For example, the flag may indicate whether VSP is applied for the MB or MB partition for a particular reference index.

With respect to macroblock layer semantics, a vsp_flag equal to 1 may specify that the current MB or MB partition is uni-directionally predicted from an inter-view reference picture, identified by non_anchor_ref_10[VOIdx][0] when the anchor_pic_flag is 0 or anchor_ref_10[VOIdx][0] when anchor_pic_flag is 1, where VOIdx is the view order index of the current view component. The motion vectors of the MB or MB partition may be derived as specified in subclause J.8.3.1.3 (e.g., of WD 4). In addition, a vsp_flag equal to 0 may specify that view synthesis prediction is not used for the current MB or MB partition. Alternatively, a vsp_flag equal to 0 may specify view synthesis prediction under GVSP is disabled, but view synthesis prediction using the reference index signaling based mechanism may be still allowed.

In another example, when vsp_flag is equal to 1, the MB or MB partition may be predicted from the first inter-view reference in RefPicList0. In another example, when vsp_flag is equal to 1, the MB or MB prediction may be predicted from the first entry in a RPLM that has modification_of_pic_nums_idc equal to 6, when vsp_pic_flag is not used to constrain the present of modification_of_pic_nums_idc. In this case, the command with modification_of_pic_nums_idc equal to 6 in the RPLM does not indicate a new entry in a reference picture list.

With respect to level constraints, when a MB or MB partition is coded with a VSP flag and has different motion vectors in at least one 8×8 block inside the MB or MB partition, a video coder, such as video encoder 20 or video decoder 30, may count the number of sub-blocks smaller than 8×8 based on the MB or MB partition. The number of sub-blocks should not exceed MaxSubMbRectSize. In this example, the video coder may determine that a VSP predicted MB has one or more sub-blocks smaller than 8×8.

Alternatively, in another example, after predicting a MB using VSP (with a vsp_flag) the video coder may determine that the MB has sub-blocks smaller than 8×8. Alternatively, in still another example, when a vsp flag is present for an MB or MB partition, for each MB partition, only one inter-view motion vector is derived, such that the MB or MB partition never has a block partition smaller than 8×8. Alternatively, in still another example, when a vsp flag is present for an MB or MB partition, for each MB partition, only one inter-view motion vector is derived for each of the 4 8×8 blocks, such that the MB or MB partition never has a block partition smaller than 8×8.

According to other aspects of this disclosure, when view synthesis prediction is enabled, a video coder may code one or more syntax elements in a parameter set, such as an SPS or SPS extension indicating whether reference based signaling is used for VSP (e.g., in which a reference picture index is generated for a view synthesis reference picture and VSP is performed based on the reference index) or whether GVSP is used for VSP (e.g., in which VSP is performed based on the macroblock signaling described above, for example, with respect to Tables 1-3 above). In some examples, the one or more syntax elements may include a flag in an SPS extension.

For example, according to aspects of this disclosure, video encoder 20 and/or video decoder 30 may use sequence parameter set extension syntax relative to WD4 (noted above), as shown in Table 4 below:

TABLE 4

Sequence Parameter Set 3DVC Extension Syntax

| seq_parameter_set_3dvc_extension( ) { | Descriptor |
|---|---|
|     for( i = 0; i <= num_level_values_signalled_minus1; i++ ) | |
|         for( j = 0; j <= num_applicable_ops_minus1[ i ]; j++ ) | |
|             applicable_op_num_depth_views_minusl[ i ][ j ] | ue(v) |
|    depth_info_present_flag | u(1) |
|    if( depth_info_present_flag ) { | |
|       3dv_acquisition_idc | ue(v) |
|       for( i = 0; i < num_views_minus1; i++ ) | |
|          view_id_3dv[ i ] | ue(v) |
|       if( 3dv_acquisition_idc ) { | |
|          depth_ranges( 2, 0 ) | |
|          if( profile_idc = = 139 && num_views_minus1 ) | |
|             vsp_param( 2, 0 ) | |
|       } | |
|       if ( profile_idc = = 139 ) | |
|          for( i = 0; i<= num_views_minus1; i++ ) | |
|             depth_preceding_texture_flag[ i ] | u(1) |
|    } | |
|    if( profile_idc = = 139 && depth_info_present_flag ) { | |
|       reduced_resolution_flag | u(1) |
|       slice_header_prediction_flag | u(1) |
|       inside_view_mvp_flag | u(1) |
|       seq_view_synthesis_flag | u(1) |
|       if( seq_view_synthesis_flag ) | |
|          vsp_pic_flag | u(1) |
|       disp_flag | u(1) |
|       psip_flag | u(1) |
|       nonlinear_depth_representation_num | ue(v) |
|       for( i = 1; i <= nonlinear_depth_representation_num; i++ ) | |
|          nonlinear_depth_representation_model[ i ] | ue(v) |
|    } | |
|    if( profile_idc = = 139 && !depth_info_present_flag ) | |
|       alc_sps_enable_flag | u(1) |
| } | |

In the example of Table 4 above, vsp_pic_flag equal to 1 indicates that the view synthesis prediction picture may be generated and referenced by a reference index in a reference picture list. In addition, vsp_pic_flag equal to 0 indicates that the view synthesis prediction picture is not generated and view synthesis prediction always refers to an inter-view reference picture. When not present, vsp_pic_flag may be inferred to be equal to 0.

According to other aspects of this disclosure, when reference index based signaling is not used, an RPLM should not contain any RPLM command that corresponds to a VSP picture. For example, when reference index based signaling is not used, a video coder (such as video encoder 20 and/or video decoder 30) may not issue an RPLM command that corresponds to a VSP picture. That is, the video coder may refrain from using an RPLM to change the position of a VSP picture, because no VSP picture has been generated.

In one example, with respect to reference picture list 3DVC modifications, the semantics specified in sub-clause I.7.4.3.1.1 (e.g., in WD 4, noted above) apply with the following additions:

The following additional table entry is inserted in Table H-1:

| modification_of_pic_nums_idc | Modification specified |
|---|---|
| 6 | vsp_ref_idx is present and corresponds to a VSP reference index | where modification of_pic_nums_idc shall not be equal to 6, if seq_view_synthesis_flag or vsp_pic_flag is equal to 0.

According to other aspects of this disclosure, when GVSP is used, the video coder may synthesize a view synthesis prediction picture from only the first inter-view reference picture for RefPicList0. In this example, no signaling of the view synthesis prediction picture is needed, and it is automatically determined (e.g., inferred) that the GVSP mode outputs a disparity motion vector pointing to the first inter-view reference picture, e.g., RefPicList0. Alternatively, in another example, the video coder may perform view synthesis prediction based on an inter-view picture in RefPicList1. Alternatively, in another example, the video coder may perform view synthesis prediction based on inter-view pictures if present, in both RefPicList0 and RefPicList1.

Figure 6:
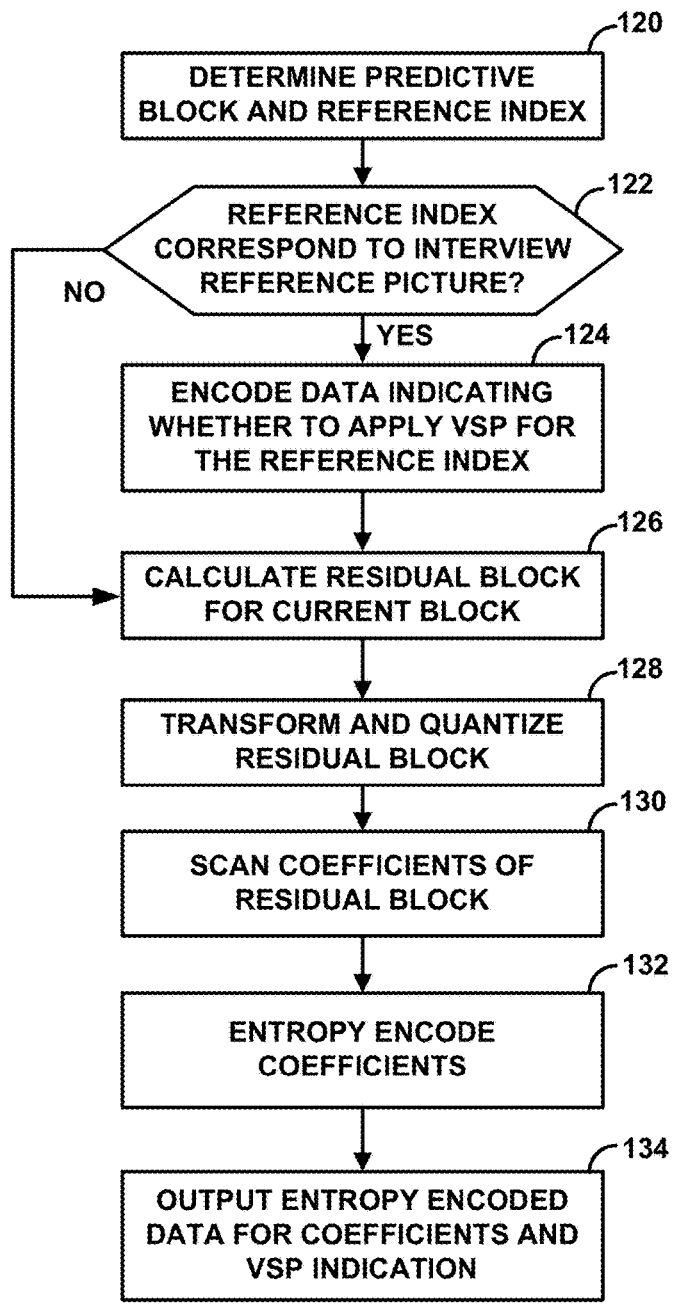
FIG. 6 is a flowchart illustrating an example method for coding information related to view synthesis prediction.

FIG. 6 is a flowchart illustrating an example method for coding information related to view synthesis prediction. The method of FIG. 6 is explained with respect to video encoder 20 (FIGS. 1 and 2). However, it should be understood that other video coding devices may be configured to perform a similar method. Moreover, certain steps in the method may be performed in a different order or in parallel. Likewise, certain steps may be omitted, and other steps may be added, in various examples.

In this example, video encoder 20 initially predicts the current block and the reference index of the predictive block (120). In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to predict the current block.

In some instances, as noted above, video encoder 20 may predict the current block from a synthesized block. For example, video encoder 20 may perform a view synthesis process to generate a synthesized picture, which may be added to a reference picture list and have a reference picture index. Video encoder 20 may perform VSP to predict the current block relative to a block of the synthesized picture.

In the example of FIG. 6, video encoder 20 may determine whether the reference index of the reference picture including the predictive block is an inter-view reference picture (122). In some examples, video encoder 20 may determine whether the reference picture is included in a different view than the block being encoded based on a view identifier (view_id).

According to aspects of this disclosure, if the reference index corresponds to an inter-view reference picture (the YES branch of step 122), video encoder 20 may encode data indicating whether to apply VSP for the reference index. For example, in instances in which video encoder 20 performed VSP to determine the predictive block, video encoder 20 may encode data indicating that VSP has been used (e.g., set a vsp_flag equal to 1). In instances in which video encoder 20 simply performed inter-view prediction to determine the predictive block (no VSP), video encoder 20 may encode data indicating that VSP has not been used (e.g., set a vsp_flag equal to 0).

Video encoder 20 may then calculate a residual block for the current block (126). To calculate the residual block, video encoder 20 may calculate a difference between the original, uncoded block and the predictive block, which may be a block in the same view as the block being coded, a block in a different view than the block being coded, or a synthesized block. Video encoder 20 may then transform and quantize coefficients of the residual block (128). Next, video encoder 20 may scan the quantized transform coefficients of the residual block (130). During or following the scan, video encoder 20 may entropy encode the coefficients (132). For example, video encoder 20 may encode the coefficients using CAVLC or CABAC. Video encoder 20 may then output the entropy coded data of the block as well as the VSP indication (134).

In this manner, the method of FIG. 6 represents an example of a method for encoding video data, the method including determining whether a reference index for a current block corresponds to an inter-view reference picture, when the reference index for the current block corresponds to the inter-view reference picture, generating data indicating a view synthesis prediction (VSP) mode of the current block, where the VSP mode for the reference index indicates whether the current block is predicted with view synthesis prediction from the inter-view reference picture, and encoding the data indicating the VSP mode in a bitstream.

Figure 7:
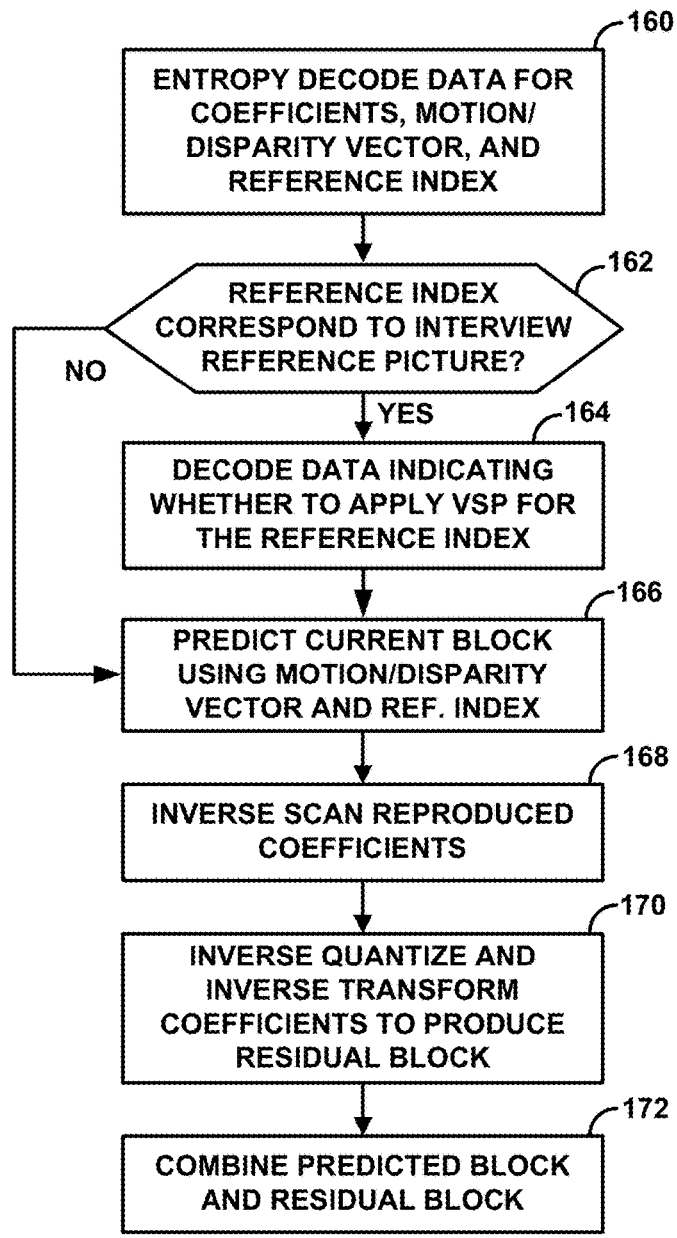
FIG. 7 is a flowchart illustrating another example method for coding information related to view synthesis prediction.

FIG. 7 is a flowchart illustrating an example method for coding information related to view synthesis prediction. The method of FIG. 7 is explained with respect to video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples.

Entropy decoding unit 70 entropy decodes the data for the coefficients of the block currently being decoded, at least one motion vector or disparity vector, and at least one corresponding reference index (160). The example of FIG. 7 assumes that the current block is uni-predicted, but it should be understood that in other examples, the current block may be bi-predicted, as described herein.

The motion vector or disparity vector may identify the predictive block in the reference picture associated with the decoded reference picture index. For example, the current block may be inter-predicted from a block in the same view as the current block, inter-view predicted from a block in a different view than the current block, or inter-view predicted from a synthesized block using VSP. Regardless of the particular prediction process, the decoded reference index identifies a picture stored to a reference picture memory.

In the example of FIG. 7, video decoder 30 may determine whether the reference index of the reference picture including the predictive block is an inter-view reference picture (162). In some examples, video decoder 30 may determine whether the reference picture is included in a different view than the block being encoded based on a view identifier (view_id).

According to aspects of this disclosure, if the reference index corresponds to an inter-view reference picture (the YES branch of step 162), video decoder 30 may decode data indicating whether to apply VSP for the reference index. For example, in instances in which VSP is to be used to determine the predictive block, video decoder 30 may decode data indicating that VSP is to be used (e.g., video decoder 30 may obtain, from an encoded bitstream, a vsp_flag equal to 1). In instances in which video decoder 30 is to perform inter-view prediction without VSP to determine the predictive block, video decoder 30 may decode data indicating that VSP is not to be used (e.g., video decoder 30 may obtain, from an encoded bitstream, a vsp_flag equal to 0). In some examples, if the reference index corresponds to an inter-view reference picture but there is no VSP indication included in the bitstream (e.g., no vsp_flag is present), video decoder 30 may automatically determine (infer) that the current block is inter-view predicted without VSP.

Video decoder 30 may predict the current block using the decoded motion or disparity vector and reference picture index (166). In instances in which VSP is used, video decoder 30 may generate a synthesized picture to determine the predictive block. Video decoder 30 may then inverse scan the reproduced coefficients (168), to create a block of quantized transform coefficients. Video decoder 30 may then inverse quantize and inverse transform the coefficients to produce a residual block (170). Video decoder 30 may ultimately decode the current block by combining the predicted block and the residual block (172).

In this manner, the method of FIG. 7 represents an example of a method including determining whether a reference index for a current block corresponds to an inter-view reference picture, and when the reference index for the current block corresponds to the inter-view reference picture, obtaining, from an encoded bitstream, data indicating a view synthesis prediction (VSP) mode of the current block, where the VSP mode for the reference index indicates whether the current block is predicted with view synthesis prediction from the inter-view reference picture.

The techniques described above with respect to view synthesis may be performed by video encoder 20 (FIGS. 1 and 2) and/or video decoder 30 (FIGS. 1 and 3), both of which may be generally referred to as a video coder. Likewise, "coding" and "video coding" may refer to either video encoding (e.g., by a video encoder) or video decoding (e.g., by a video decoder), as applicable.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
    determining that a reference index of a reference picture in a reference picture list for predicting a current block, of a first view, corresponds to an inter-view reference picture of a second view, wherein the second view is different than the first view;
    based on the determination that the reference index corresponds to the inter-view reference picture and only when the reference index for the current block is determined to correspond to an inter-view reference picture, obtaining, from an encoded bitstream, a block-level view synthesis prediction (VSP) flag that indicates whether the current block is predicted with VSP using at least a portion of a picture synthesized from the inter-view reference picture; and
    based on an indication that the current block is predicted with VSP, decoding the current block using VSP.

2. The method of claim 1, wherein the block level is a macroblock level when the current block is a macroblock or a macroblock partition level when the current block is a macroblock partition.

3. The method of claim 1, further comprising decoding a slice header that does not include an indication of a reference index of a view synthesis reference picture for decoding the current block using VSP.

4. The method of claim 1, wherein the reference picture list comprises only reference picture list zero.

5. The method of claim 1, wherein the reference picture list comprises one of a first reference picture list or a second reference picture list.

6. The method of claim 1, wherein the block-level VSP flag comprises data indicating a first VSP mode for the current block, the method further comprising obtaining, from the encoded bitstream, data indicating whether to perform one of the first VSP mode or a second VSP mode, wherein performing the second VSP mode comprises determining a view synthesis reference picture based on a reference picture index of the view synthesis reference picture.

7. The method of claim 1, further comprising:
determining a view synthesis reference picture from the inter-view reference picture;
adding the view synthesis prediction picture to the reference picture list, wherein a reference picture list modification process is not used to reorder the view synthesis prediction picture; and
wherein decoding the current block using VSP comprises decoding the current block relative to the view synthesis reference picture.

8. The method of claim 1, wherein obtaining the block-level VSP flag comprises obtaining the block-level VSP flag only when the inter-view reference picture is included in reference picture list zero.

9. The method of claim 1, wherein obtaining the block-level VSP flag comprises obtaining the block-level VSP flag only when the inter-view reference picture is included in reference picture list one.

10. An apparatus for decoding video data, the apparatus comprising:
a memory configured to store video data including a current block; and
one or more processors configured to:
determine that a reference index of a reference picture in a reference picture list for predicting the current block, of a first view, corresponds to an inter-view reference picture of a second view, wherein the second view is different than the first view;
based on the determination that the reference index corresponds to the inter-view reference picture and only when the reference index for the current block is determined to correspond to an inter-view reference picture, obtain, from an encoded bitstream, a block-level view synthesis prediction (VSP) flag that indicates whether the current block is predicted with VSP using at least a portion of a picture synthesized from the inter-view reference picture; and
based on an indication that the current block is predicted with VSP, decode the current block using VSP.

11. The apparatus of claim 10, wherein the block level is a macroblock level when the current block is a macroblock or a macroblock partition level when the current block is a macroblock partition.

12. The apparatus of claim 10, wherein the one or more processors are further configured to decode a slice header that does not include an indication of a reference index of a view synthesis reference picture for decoding the current block using VSP.

13. The apparatus of claim 10, wherein the reference picture list comprises only reference picture list zero.

14. The apparatus of claim 10, wherein the reference picture list comprises one of a first reference picture list or a second reference picture list.

15. The apparatus of claim 10, wherein the block-level VSP flag comprises data indicating a first VSP mode for the current block, and wherein the one or more processors are further configured to obtain, from the encoded bitstream, data indicating whether to perform one of the VSP mode or a second VSP mode, wherein to perform the second VSP mode, the one or more processors are configured to determine a view synthesis reference picture based on a reference picture index of the view synthesis reference picture.

16. The apparatus of claim 10, wherein the one or more processors are further configured to:
determine a view synthesis reference picture from the inter-view reference picture;
add the view synthesis prediction picture to the reference picture list, wherein a reference picture list modification process is not used to reorder the view synthesis prediction picture; and
wherein to decode the current block using VSP, the one or more processors are configured to decode the current block relative to the view synthesis reference picture.

17. The apparatus of claim 10, wherein to obtain the block-level VSP flag, the one or more processors are configured to obtain the block-level VSP flag only when the inter-view reference picture is included in reference picture list zero.

18. The apparatus of claim 10, wherein to obtain the block-level VSP flag, the one or more processors are configured to obtain the block-level VSP flag only when the inter-view reference picture is included in reference picture list one.

19. A method of encoding video data, the method comprising:
determining that a reference index of a reference picture in a reference picture list for predicting a current block, of a first view, corresponds to an inter-view reference picture of a second view, wherein the second view is different than the first view;
based on the determination that the reference index corresponds to the inter-view reference picture and only when the reference index for the current block is determined to correspond to an inter-view reference picture, generating a block-level view synthesis prediction (VSP) flag that indicates whether the current block is predicted with VSP using at least a portion of a picture synthesized from the inter-view reference picture; and
encoding the block-level VSP flag in a bitstream.

20. The method of claim 19, wherein the block level is a macroblock level when the current block is a macroblock or a macroblock partition level when the current block is a macroblock partition.

21. The method of claim 19, further comprising encoding a slice header that does not include an indication of a reference index of a view synthesis reference picture for encoding the current block.

22. The method of claim 19, wherein the reference picture list comprises only reference picture list zero.

23. The method of claim 19, wherein the reference picture list comprises one of a first reference picture list or a second reference picture list.

24. The method of claim 19, wherein the block-level VSP flag comprises data indicating a first VSP mode for the current block, and further comprising encoding data indicating whether to perform one of the VSP mode or a second VSP mode, wherein performing the second VSP mode comprises determining a view synthesis reference picture based on a reference picture index of the view synthesis reference picture.

25. The method of claim 19, further comprising:
determining a view synthesis reference picture from the inter-view reference picture;
adding the view synthesis prediction picture to the reference picture list, wherein a reference picture list modification process is not used to reorder the view synthesis prediction picture; and
encoding the current block relative to the view synthesis reference picture.

26. The method of claim 19, further comprising synthesizing a view synthesis reference picture from the inter-view reference picture only when the inter-view reference picture is included in reference picture list zero.

27. The method of claim 19, further comprising synthesizing a view synthesis reference picture from the inter-view reference picture only when the inter-view reference picture is included in reference picture list one.

28. An apparatus for encoding video data, the apparatus comprising:
a memory configured to store video data including a current block; and
one or more processors configured to:
determine that a reference index of a reference picture in a reference picture list for predicting a current block, of a first view, corresponds to an inter-view reference picture of a second view, wherein the second view is different than the first view;
based on the determination that the reference index corresponds to the inter-view reference picture and only when the reference index for the current block is determined to correspond to an inter-view reference picture, generate a block-level view synthesis prediction (VSP) flag that indicates whether the current block is predicted with VSP using at least a portion of a picture synthesized from the inter-view reference picture; and
encode the block-level VSP flag in a bitstream.

29. The apparatus of claim 28, wherein the block level is a macroblock level when the current block is a macroblock or a macroblock partition level when the current block is a macroblock partition.

30. The apparatus of claim 28, wherein the one or more processors are further configured to encode a slice header that does not include an indication of a reference index of a view synthesis reference picture for encoding the current block.

31. The apparatus of claim 28, wherein the reference picture list comprises only reference picture list zero.

32. The apparatus of claim 28, wherein the reference picture list comprises one of a first reference picture list or a second reference picture list.

33. The apparatus of claim 28, wherein the block-level VSP flag comprises data indicating a first VSP mode for the current block, and wherein the one or more processors are further configured to encode data indicating whether to perform one of the VSP mode or a second VSP mode, wherein to perform the second VSP mode, the one or more processors are configured to determine a view synthesis reference picture based on a reference picture index of the view synthesis reference picture.

34. The apparatus of claim 28, wherein the one or more processors are further configured to:
determine a view synthesis reference picture from the inter-view reference picture;
add the view synthesis prediction picture to the reference picture list, wherein a reference picture list modification process is not used to reorder the view synthesis prediction picture; and
encode the current block relative to the view synthesis reference picture.

35. The apparatus of claim 28, wherein the one or more processors are further configured to synthesize a view synthesis reference picture from the inter-view reference picture only when the inter-view reference picture is included in reference picture list zero.

36. The apparatus of claim 28, wherein the one or more processors are further configured to synthesize a view synthesis reference picture from the inter-view reference picture only when the inter-view reference picture is included in reference picture list one.

37. A non-transitory computer-readable medium having instructions stored thereon that, when executed, cause one or more processors to:
determine that a reference index of a reference picture in a reference picture list for predicting a current block, of a first view, corresponds to an inter-view reference picture of a second view, wherein the second view is different than the first view; and
based on the determination that the reference index corresponds to the inter-view reference picture and only when the reference index for the current block is determined to correspond to an inter-view reference picture, decode a block-level view synthesis prediction (VSP) flag that indicates whether the current block is predicted with VSP using at least a portion of a picture synthesized from the inter-view reference picture; and
based on an indication that the current block is predicted with VSP, decode the current block using VSP.

38. The non-transitory computer-readable medium of claim 37, wherein the block level is a macroblock level when the current block is a macroblock or a macroblock partition level when the current block is a macroblock partition.

39. An apparatus for coding video data, the apparatus comprising:
means for determining that a reference index of a reference picture in a reference picture list for predicting a current block, of a first view, corresponds to an inter-view reference picture of a second view, wherein the second view is different than the first view; and
means for decoding, based on the determination that the reference index corresponds to the inter-view reference picture and only when the reference index for the current block is determined to correspond to an inter-view reference picture, a block-level view synthesis prediction (VSP) flag that indicates whether the current block is predicted with VSP using at least a portion of a picture synthesized from the inter-view reference picture; and
means for decoding, based on an indication that that the current block is predicted with VSP, the current block using VSP.

40. The apparatus of claim 39, wherein the block level is a macroblock level when the current block is a macroblock or a macroblock partition level when the current block is a macroblock partition.

* * * * *